(12) United States Patent
Inagaki

(10) Patent No.: US 7,803,474 B2
(45) Date of Patent: Sep. 28, 2010

(54) THERMAL STRESS TOLERANT FUEL CELL ASSEMBLY WITHIN A HOUSING

(75) Inventor: Toshiyuki Inagaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1118 days.

(21) Appl. No.: 10/565,102

(22) PCT Filed: Jul. 19, 2004

(86) PCT No.: PCT/IB2004/002317

§ 371 (c)(1), (2), (4) Date: Jan. 19, 2006

(87) PCT Pub. No.: WO2005/008826

PCT Pub. Date: Jan. 27, 2005

(65) Prior Publication Data

US 2006/0177722 A1    Aug. 10, 2006

(30) Foreign Application Priority Data

Jul. 22, 2003  (JP) ............................. 2003-277291
Nov. 25, 2003 (JP) ............................. 2003-393887

(51) Int. Cl.
  H01M 2/02   (2006.01)
  H01M 8/10   (2006.01)
(52) U.S. Cl. ............................. 429/34; 429/37; 429/32
(58) Field of Classification Search .................. 429/34, 429/37, 35, 12, 26, 32
See application file for complete search history.

(56) References Cited

U.S. PATENT DOCUMENTS 4,176,213 A    11/1979  Van Linden
5,824,199 A *  10/1998  Simmons et al. ............ 204/262
2002/0187382 A1* 12/2002 Nishiumi et al. .............. 429/34

FOREIGN PATENT DOCUMENTS

DE    196 45 111 A   5/1998

(Continued)

OTHER PUBLICATIONS

Patent Abstracts of Japan, vol. 1997, No. 08, Aug. 29, 1997 & JP 9 092324 A (Toyota Motor Corp) Apr. 4, 1997.

(Continued)

*Primary Examiner*—Raymond Alejandro
(74) *Attorney, Agent, or Firm*—Kenyon & Kenyon LLP

(57) ABSTRACT

A fuel cell assembly includes multi-cell modules disposed in series and in a stacking direction, and an external member provided along the plurality of multi-cell modules in the stacking direction, and an external restrainer member provided along the external member in the stacking direction. Each multi-cell module of the plurality of multi-cell modules has, a multi-cell assembly formed by stacking a plurality of cells, and a module frame having a first wall that surrounds the multi-cell assembly and that extends in the cell stacking direction of the multi-cell assembly, and wherein the external restrainer member is provided between an internal surface of the external member and an external surface of the first wall of the module frame of the multi-cell module, and contacts the internal surface of the external member and the external surface of the first wall.

24 Claims, 26 Drawing Sheets

FOREIGN PATENT DOCUMENTS

| | | |
|---|---|---|
| DE | 100 41 532 A1 | 3/2001 |
| DE | 100 49 801 A | 4/2001 |
| DE | 102 13 558 A1 | 11/2002 |
| GB | 2 336 937 A | 11/1999 |
| JP | 54-11451 | 1/1979 |
| JP | 58-164169 A | 9/1983 |
| JP | 59-215676 A | 12/1984 |
| JP | 01-281681 A | 11/1989 |
| JP | 02-220364 A | 9/1990 |
| JP | 08-022837 A | 1/1996 |
| JP | 09-092324 A | 4/1997 |
| JP | 09-289027 A | 11/1997 |
| JP | 10-189025 A | 7/1998 |
| JP | 10-228918 A | 8/1998 |
| JP | 2000-113896 A | 4/2000 |
| JP | 2001-110439 A | 4/2001 |
| JP | 2002-124291 A | 4/2002 |
| JP | 2002-260708 A | 9/2002 |
| JP | 2003-086229 A | 3/2003 |
| JP | 2003-203670 A | 7/2003 |
| WO | WO 99/57781 | 11/1999 |

OTHER PUBLICATIONS

International Search Report, European Patent Office, Nov. 24, 2004.
Written Opinion of International Serching Authority, European Patent Office, Nov. 24, 2004.
International Preliminary Report on Patentability, European Patent Office, Nov. 8, 2005.
German Language Version of German Office Action, Appln. No. 11 2004 001 327.5, issued Apr. 27, 2007.
English Translation of German Office Action, Appln. No. 11 2004 001 327.5, issued Apr. 27, 2007.

* cited by examiner

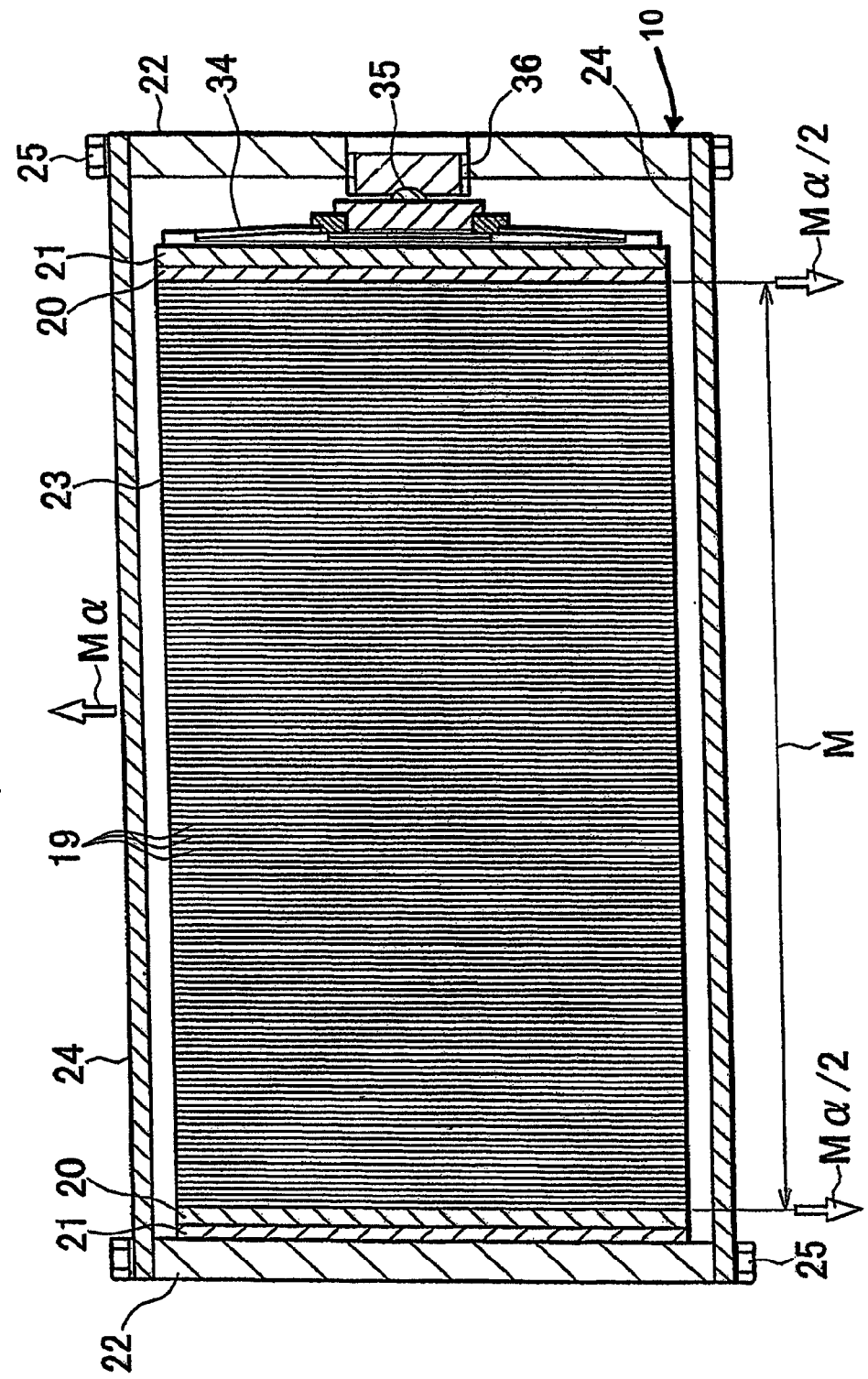

THERMAL STRESS TOLERANT FUEL CELL ASSEMBLY WITHIN A HOUSING

INCORPORATION BY REFERENCE

This is a 371 national phase application of PCT/IB2004/002317 filed Jul. 17, 2004, the content of which is incorporated herein by reference. The disclosure of Japanese Patent Application No. 2003-277291 filed on Jul. 22, 2003 and Japanese Patent Application No. 2003-393887 filed on Nov. 25, 2003, including the specification, drawings and abstract, are incorporated herein by reference in their entirety.

BACKGROUND OF THE INVENTION

1. Field of the Invention

The invention relates to a fuel cell assembly and, more particularly, to a cell stack structure of a fuel cell assembly.

2. Description of the Related Art

As disclosed in Japanese Patent Application Laid-Open Publication No. 2002-124291, or as shown in FIGS. 30 and 31, a FUEL CELL assembly, for example, a solid polymer electrolyte type fuel cell assembly 10 (FIG. 31), is formed by a stack of membrane-electrode assemblies (MEAs) and separators 18. The stacking direction is not limited to vertical directions but may be an arbitrary direction. Each membrane-electrode assembly is sandwiched by a pair of separators 18 to form a unit cell 19.

Each membrane-electrode assembly includes an electrolyte membrane 11 having an ion exchange membrane, an electrode (anode or fuel electrode) 14 having a catalytic layer 12 disposed on a surface of the electrolyte membrane 11, and an electrode (cathode or air electrode) 17 having a catalytic layer 15 disposed on another surface of the electrolyte membrane 11. Anode-side diffusion layers 13 and cathode-side diffusion layers 16 are provided between the membrane-electrode assemblies and the separators 18.

Each separator 18 has a fuel gas channel 27 for supplying a fuel gas (hydrogen) to the anode 14, and an oxidizing gas channel 28 for supplying an oxidizing gas (oxygen, or air in ordinary cases) to the cathode 17. Each separator further has a coolant channel 26 for passing a coolant (cooling water in ordinary cases) in a surface opposite from the channels 27, 28. Rubber gaskets 32 and adhesive seals 33 are provided in order to seal the channels 26, 27, 28.

On the anode side of each cell, a reaction occurs in which hydrogen is separated into hydrogen ions (protons) and electrons. The hydrogen ions migrate through the electrolyte membrane to the cathode side. On the cathode side, a reaction mentioned below occurs in which water is produced from oxygen, hydrogen ions and electrons (i.e., the electrons produced on the anode of the adjacent MEA come to the cathode through the separator, or the electrons produced on the anode of the cell disposed at an end in the cell stacking direction come to the cathode of the cell at the opposite end via an external circuit), whereby electricity is generated.

Anode side: 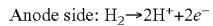

Cathode side: 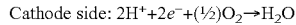

In a conventional stacking method, modules are retained in the following manner. A spring 34 is disposed on an end of a cell stack in the cell stacking direction, and a swing portion 35 and an adjusting screw 36 are provided thereat. The modules of the stack 23 are retained with the spring force of the spring 34 providing a constant load in the cell stacking direction, and are retained in directions perpendicular to the cell stacking directions by the friction force of the spring force×the friction coefficient. In some cases, the modules are restrained from outside the cell stack through the use of an external restrainer member, in order to further reliably retain the modules in directions perpendicular to the cell stacking direction.

Further, document DE 100 49 801 A1 discloses a fuel cell assembly, wherein fuel cell modules are secured in the stack axis by an elastic holding plate that is coated with an insulating material. A spring applies a uniform pressure on the stack. The so build fuel cell assembly is enclosed within a container to prevent intrusion of impurities into the assembly.

Another fuel cell assembly is disclosed in document DE 195 45 11 A1. This assembly comprises a plurality of fuel cell modules surrounded by an elastic, having an insulating layer. Elastic members are provided to relieve mechanical movement of the modules due to thermal expansion.

Further, document U.S. Pat. No. 4,176,213 discloses a battery unit, containing one or more fuel-cell blocks, wherein the blocks are attached to a beam having an I-shaped cross-section, on both sides against the thin intermediate section thereof.

Document U.S. Pat. No. 5,824,199 A further discloses an electrochemical cell having an inflatable member, wherein a conductive inflatable member is provided between an electrode and a current for providing uniform contact pressure, and thus uniform electrical contact between the electrode and the current bus. The inflatable member comprises a pair of flexible plates, where one plate is thinner than the other.

Further, document JP 09092324 discloses a cell module which is formed of a cell layered product and a module forming member. Each module has a module frame clamping a plurality of single unit cells together, wherein the stacked modules are surrounded by an external enclosure. An insulation layer made from rubber or resin is provided between multi-cell modules and an inner wall of a frame as well as between an outer wall of the frame and the enclosure.

The conventional stacking method has the following problems.

1. When a cell stack having a total mass of M receives an impact of an acceleration a of several gravitational accelerations to about 20 G (G is the gravitational acceleration), a shearing force of Mα/2 occurs near an end portion of the cell stack. If the shearing force becomes greater than the spring force times the friction coefficient, sliding occurs between modules adjacent to the end portion of the cell stack so that the cell stack may disassemble.

2. If modules are retained from outside a cell stack by an external restrainer member, there is a risk of a stack end cell sticking onto the external restrainer member while moving in the cell stacking direction relatively to the external restrainer member as cell constituent members, such as MEAs, diffusion layers, etc., creep due to spring force. Thus, there is a risk of damage to cells. If the spring force is reduced in order to reduce the creep, attainment of a necessary inter-cell contact surface pressure is likely to become impossible.

A problem to be solved by the invention is that a cell stack disassembles as modules adjacent to an end portion of the stack slide upon an impact of acceleration in a direction perpendicular to the cell stacking direction (first problem).

Another problem to be solved by the invention is the disassembly of a cell stack upon an impact of acceleration in a direction perpendicular to the cell stacking direction combined with damages to a cell near an end portion of the stack caused in conjunction with the provision of an external restrainer member as the cell becomes stuck on the external restrainer member while cells move due to creep of cell constituent members (second problem).

It is an object of the invention to provide a fuel cell assembly capable of preventing disassembly of a cell stack by preventing modules adjacent to an end portion of the cell stack from sliding upon an impact of an acceleration in a direction perpendicular to the cell stacking direction (first object).

Another object of the invention is to provide a fuel cell assembly which is capable of preventing disassembly of a cell stack by preventing modules adjacent to an end portion of the cell stack from sliding upon an impact of an acceleration in a direction perpendicular to the cell stacking direction and which avoids the sticking of a cell adjacent to an end portion of the cell stack onto an external restrainer member if such a member is provided (second object).

SUMMARY OF THE INVENTION

The aforementioned objects are achieved by the following constructions in accordance with the invention.

In accordance with an aspect of the invention, a fuel cell assembly includes a plurality of multi-cell modules disposed in series, and an external member. The multi-cell module has a multi-cell assembly formed by stacking a plurality of cells, and a module frame having a first wall that surrounds the multi-cell assembly and that extends in a cell stacking direction of the multi-cell assembly. The external member extends outside the plurality of multi-cell modules and in the cell stacking direction along the multi-cell modules.

In accordance with this aspect of the invention, the external member extends outside the plurality of multi-cell modules and in the cell stacking direction along all the multi-cell modules.

In accordance with this aspect of the invention, in the multi-cell module, the multi-cell assembly of the multi-cell module may be left unrestrained in the cell stacking direction by the module frame of the multi-cell module so as to relieve thermal expansion of a cell in the cell stacking direction.

Furthermore, in the multi-cell module, cells of the multi-cell assembly may be adhered to one another.

Still further, in the multi-cell module, a space may be formed or a deformable adhesive member may be provided between an external surface of the multi-cell assembly of the multi-cell module and an internal surface of the first wall of the module frame of the multi-cell module so as to relieve thermal expansion of a cell in a direction perpendicular to the cell stacking direction.

In the above-described aspect of the invention, an external restrainer member may be provided between an internal surface of the external device and an external surface of the first wall of a module frame of the multi-cell module.

The plurality of multi-cell modules may be disposed in series in the cell stacking direction, and a spring box may be disposed in series in the cell stacking direction with respect to the plurality of multi-cell modules disposed in series, and a spring force of the spring box may be applied to the plurality of multi-cell modules in the cell stacking direction.

The module frame may have a second wall that extends in a direction perpendicular to the cell stacking direction, in addition to the first wall.

In this construction, a coolant passage may be formed in the second wall.

In this construction, a contact surface of the second wall which contacts a cell may be formed of an electrically conductive material.

At least a portion of a contact surface of the second wall which contacts a cell may be formed so as to be displaceable in the cell stacking direction.

In this construction, a coolant passage may be formed in the second wall, and a portion of the second wall which is displaceable in the cell stacking direction may be displaced by a pressure of the coolant passage.

In the above-described aspect of the invention, an external surface of the module frame and an internal surface of the external member may contact each other in a point contact fashion.

Furthermore in the above-described aspect of the invention, the module frame may be provided with an opening for mounting, on the multi-cell assembly, a member that electrically connects the multi-cell assembly to an external device.

Still further, the module frame may include at least two frame members that are separate from each other.

Yet further, an internal surface of the module frame may have a groove for an adhesive.

The module frame may be provided with a cell monitor presser that extends from the module frame toward an external surface of the cell monitor.

Still further in the above-described aspect of the invention, at least a portion of the module frame may be formed of a non-electrically conductive material.

Frame members that constitute the module frame made of a resin may be disposed at four corner sites of an end cell of a multi-cell assembly of the multi-cell module.

The module frame may be formed of an elastic member.

A friction coefficient of a surface of the elastic member may be smaller than a friction coefficient of the elastic member itself.

The module frame may be connected to an end cell of a multi-cell assembly of the multi-cell module.

A wire may be embedded in the module frame.

BRIEF DESCRIPTION OF THE DRAWINGS

FIG. 31 is a sectional view of a cell stack of a related-art fuel cell assembly.

DETAILED DESCRIPTION OF EXEMPLARY EMBODIMENTS

Figure 5:
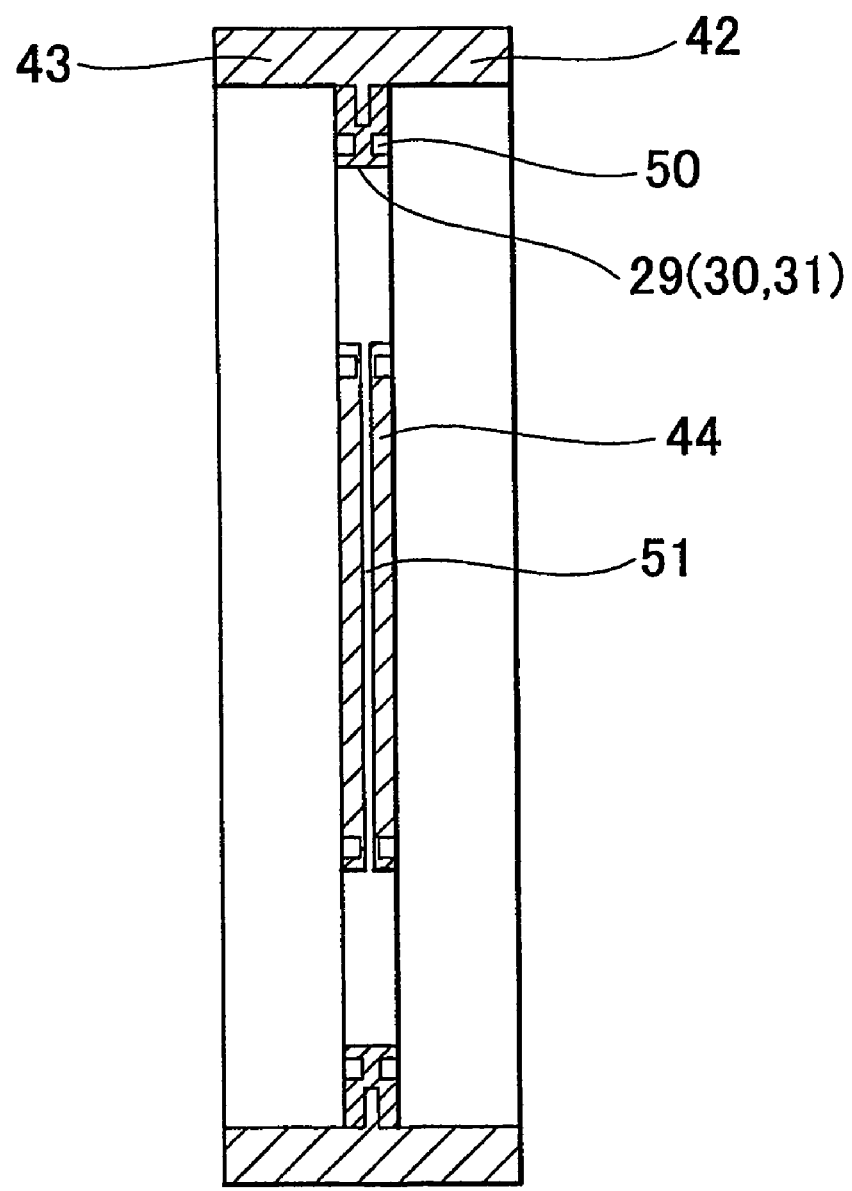
FIG. 5 is a sectional view of a module frame of a multi-cell module of a fuel cell assembly in Embodiment 2 of the invention.
Figure 6:
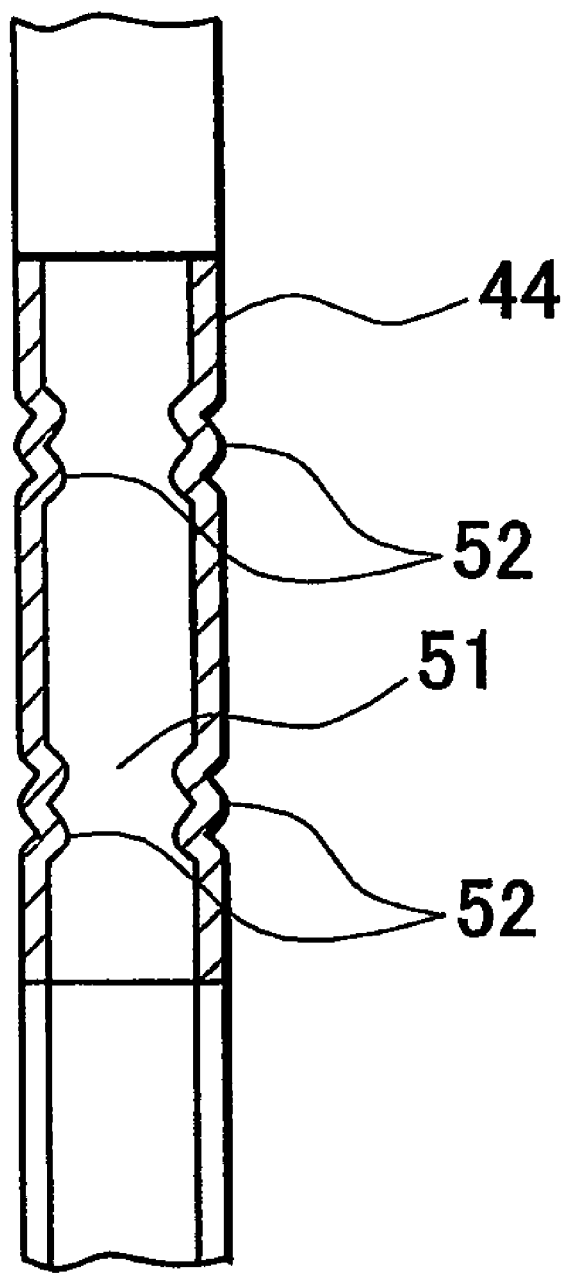
FIG. 6 is a sectional view of a second wall of a module frame of a multi-cell module of a fuel cell assembly in Embodiment 3 of the invention.
Figure 7:
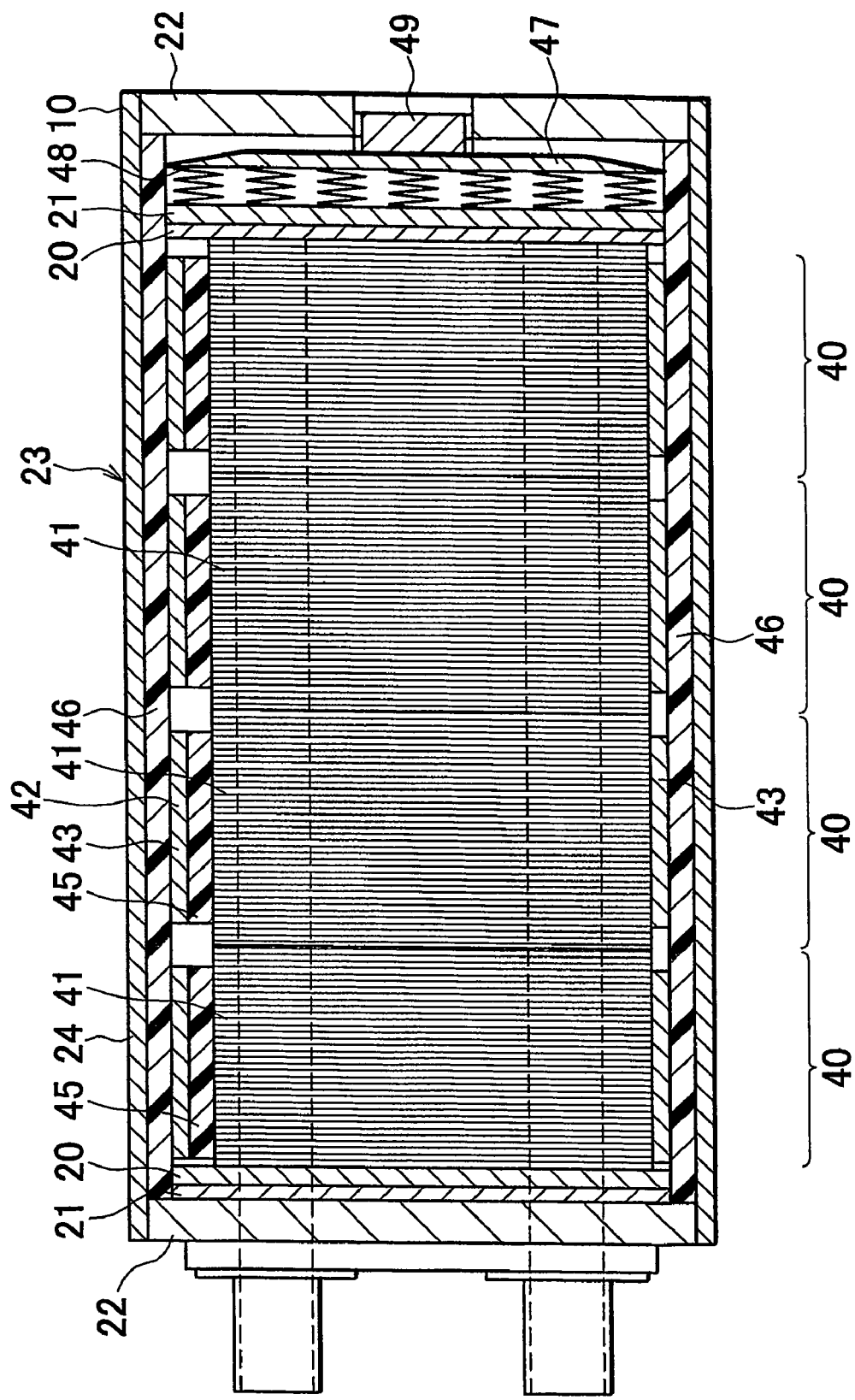
FIG. 7 is a sectional view of a cell stack of a fuel cell assembly in Embodiment 4 of the invention.
Figure 8:
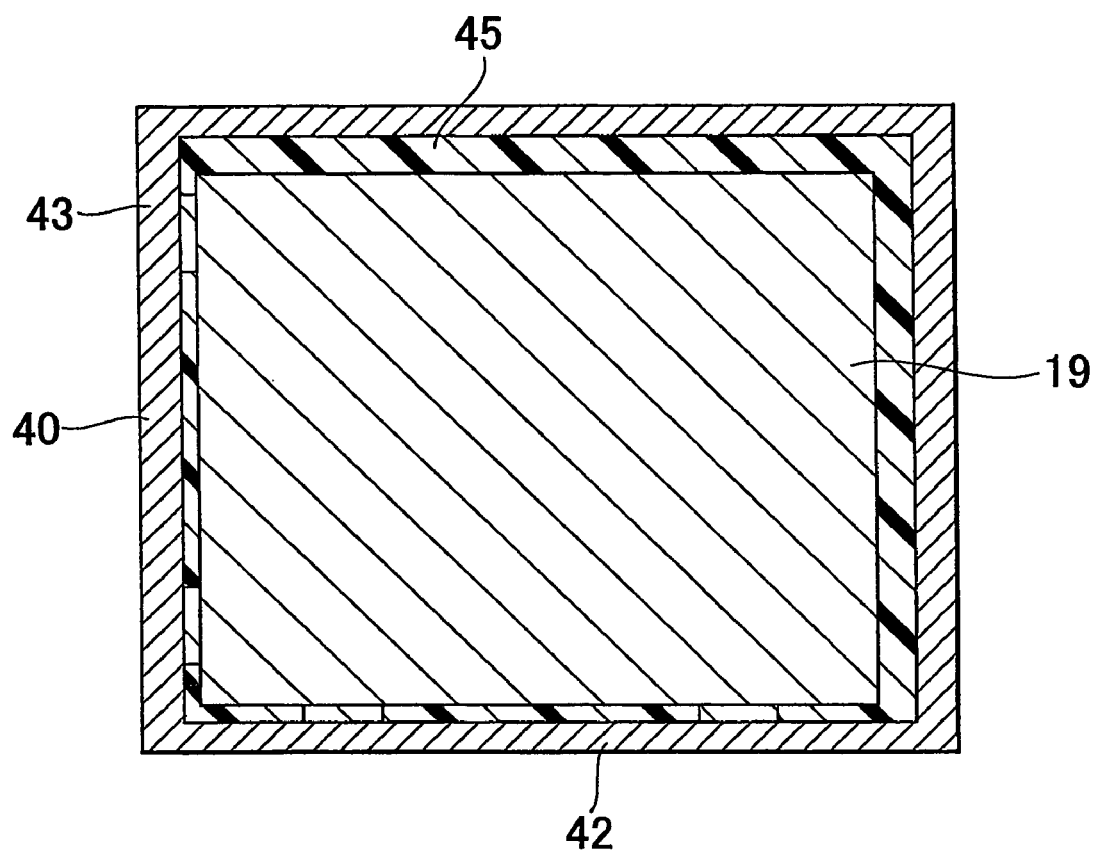
FIG. 8 is a cross-sectional view of a cell stack of a fuel cell assembly in Embodiment 4 of the invention.
Figure 9:
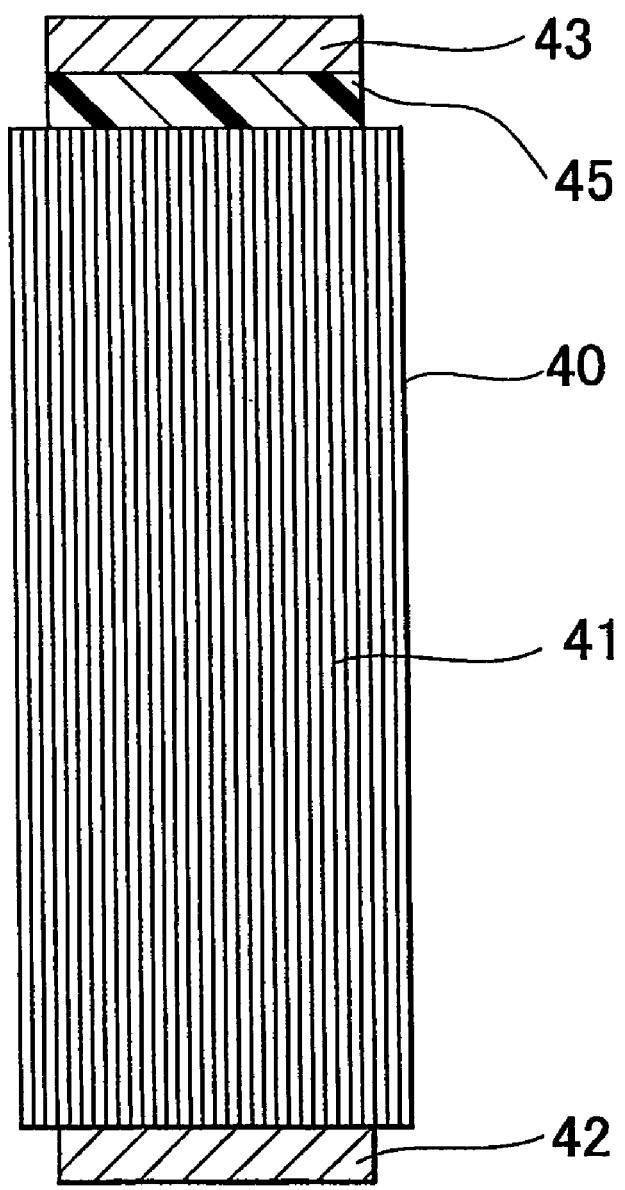
FIG. 9 is a sectional view of a multi-cell module of a fuel cell assembly in Embodiment 4 of the invention.
Figure 10:
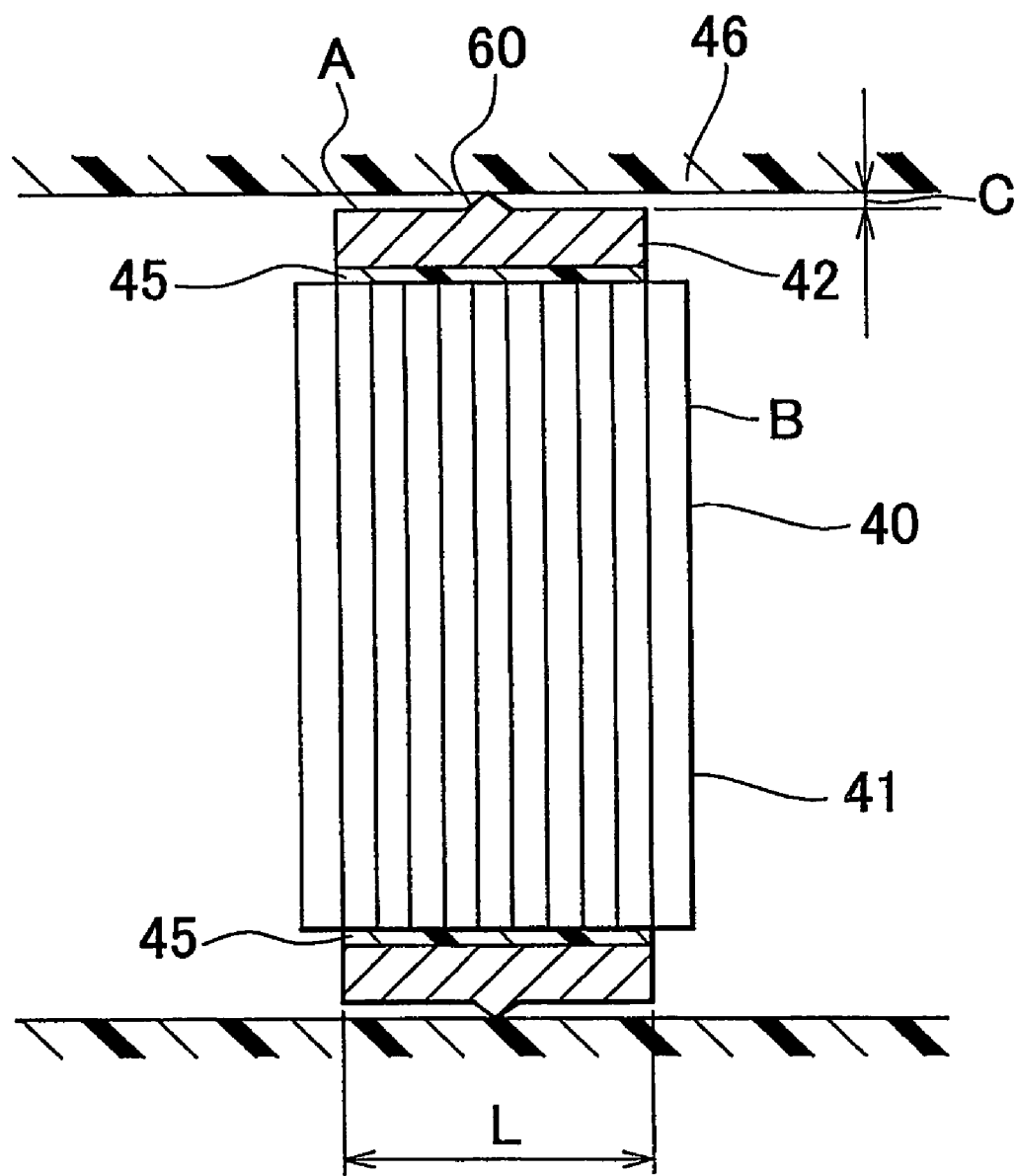
FIG. 10 is a sectional view of a multi-cell module of a fuel cell assembly in Embodiment 5 of the invention.
Figure 11:
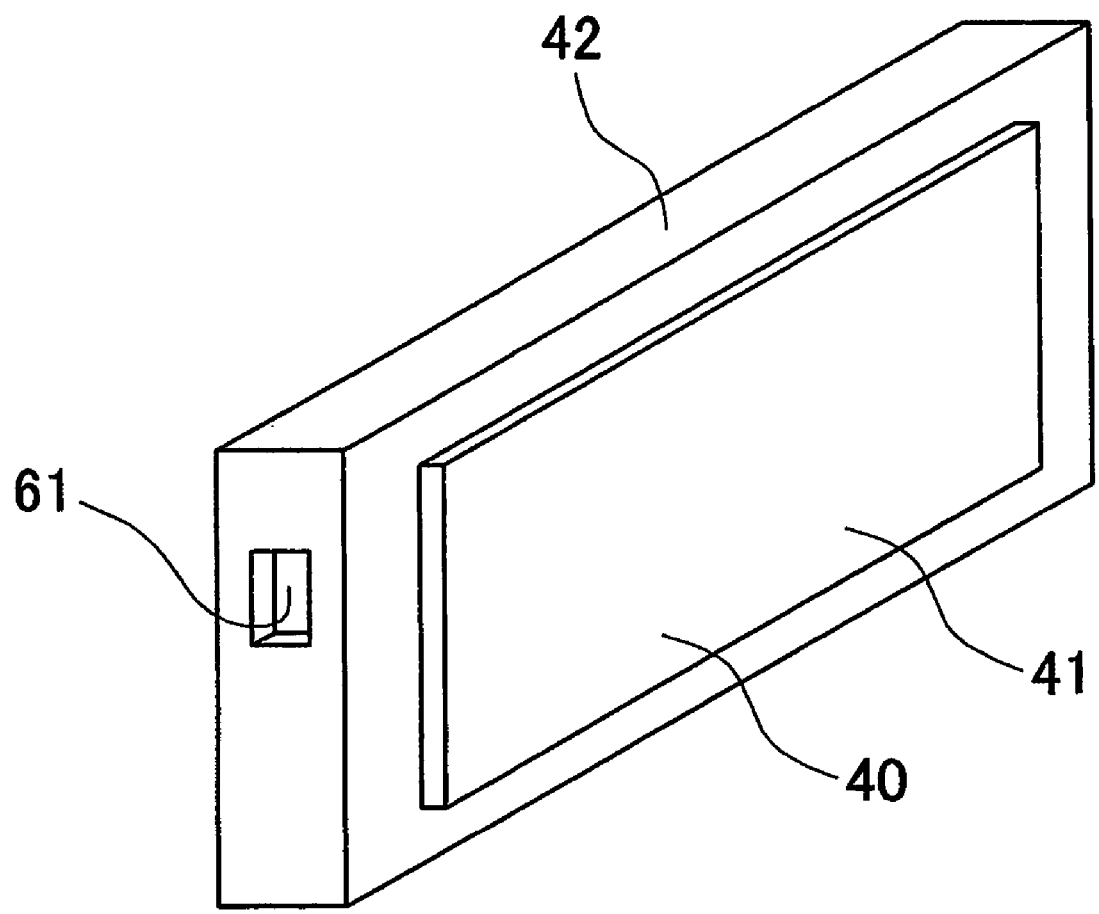
FIG. 11 is a perspective view of a multi-cell module of a fuel cell assembly in Embodiment 6 of the invention.
Figure 12:
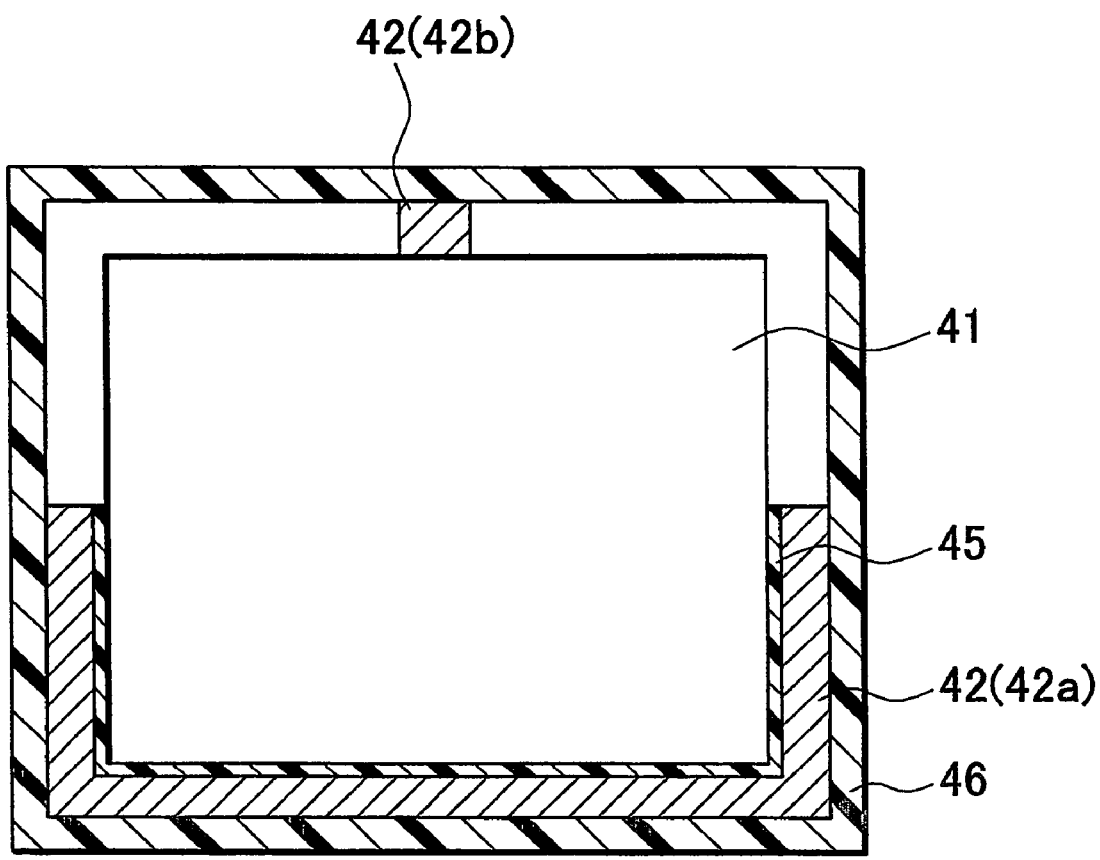
FIG. 12 is a sectional view of a multi-cell module of a fuel cell assembly in Embodiment 7 of the invention.
Figure 14:
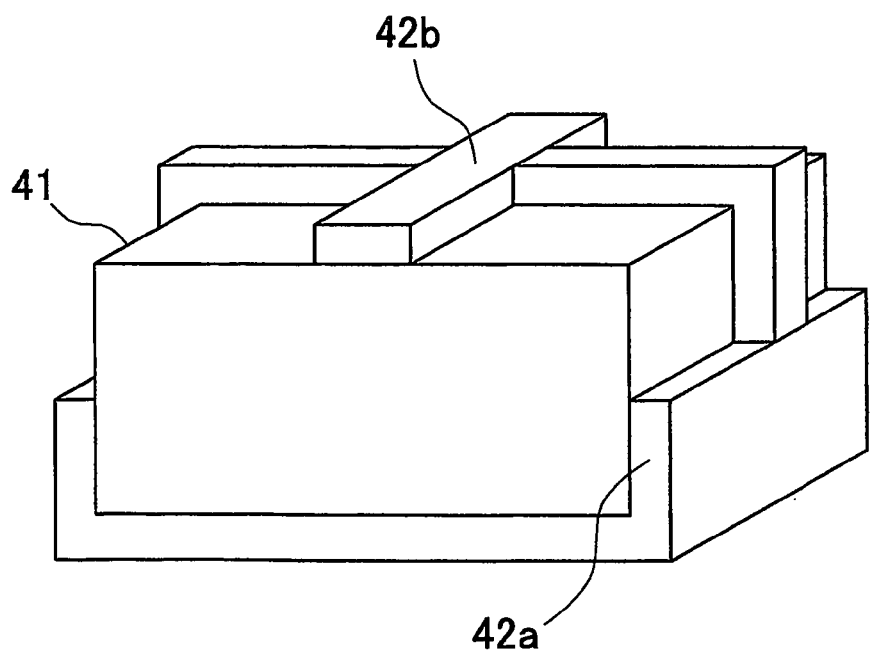
FIG. 14 is a perspective view of a structure for connecting a plurality of frame bodies in a multi-cell module of a fuel cell assembly in Embodiment 7 of the invention which is different from the structure shown in FIG. 13.
Figure 15:
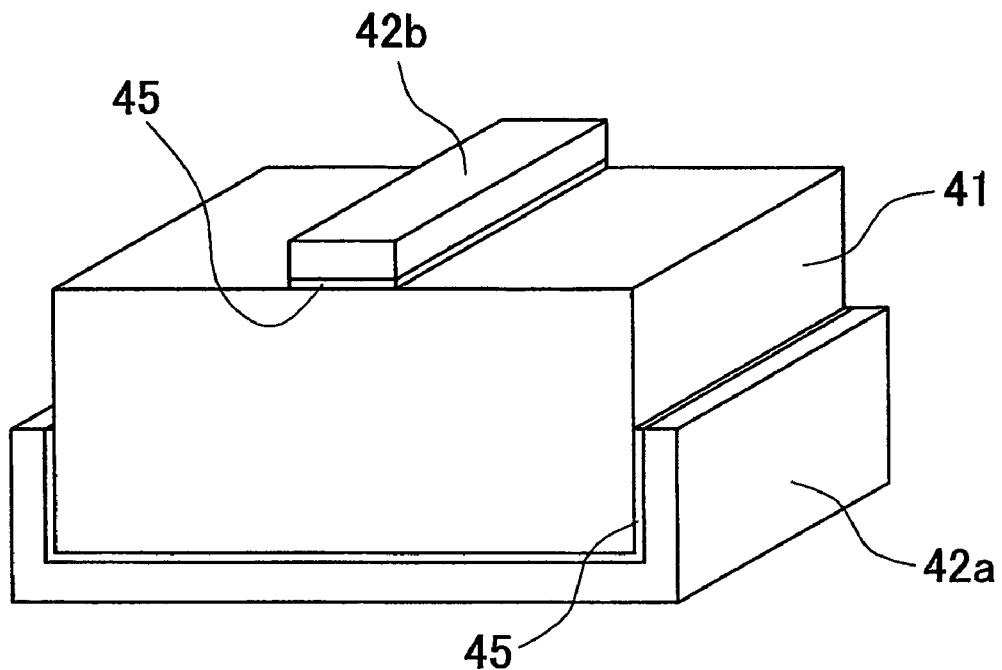
FIG. 15 is a perspective view of a structure for connecting a plurality of frame bodies in a multi-cell module of a fuel cell assembly in Embodiment 7 of the invention which is different from the structures shown in FIGS. 13 and 14.
Figure 16:
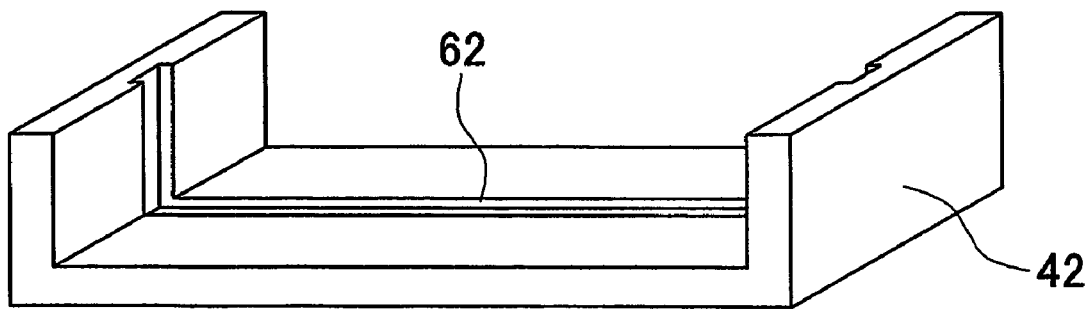
FIG. 16 is a perspective view of a module frame (with a single groove for adhesive) of a multi-cell module of a fuel cell assembly in Embodiment 8 of the invention.
Figure 17:
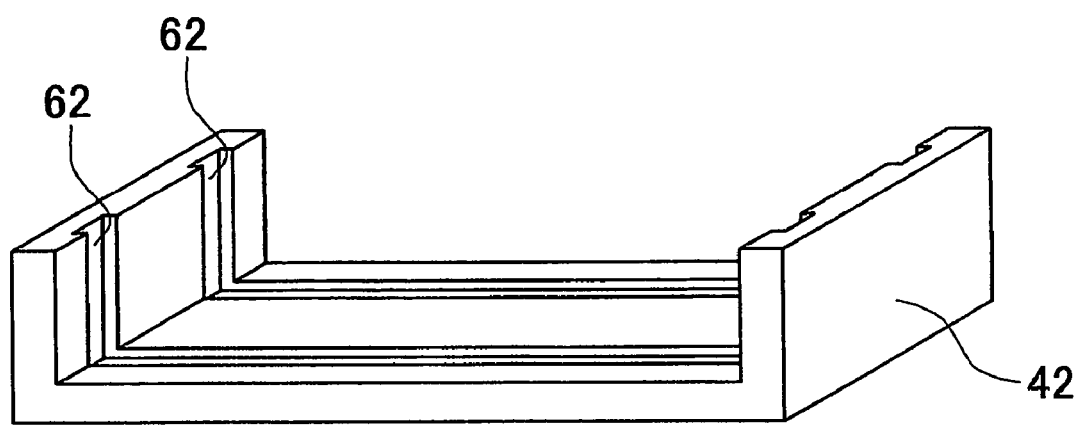
FIG. 17 is a perspective view of a module frame (with two grooves for adhesive) of a multi-cell module of a fuel cell assembly in Embodiment 8 of the invention.
Figure 18:
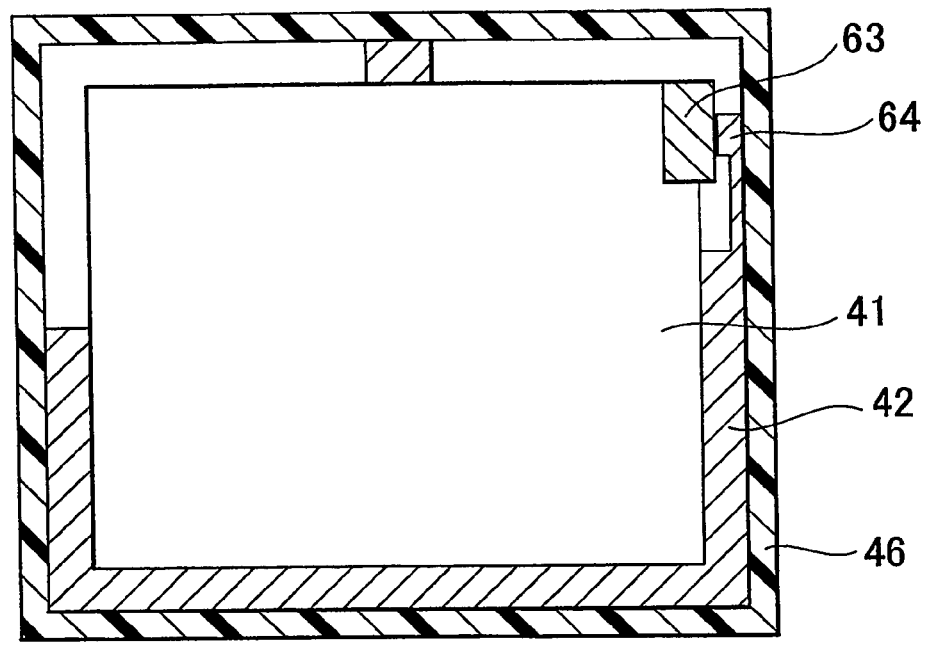
FIG. 18 is a sectional view of a multi-cell module of a fuel cell assembly in Embodiment 9 of the invention.
Figure 19:
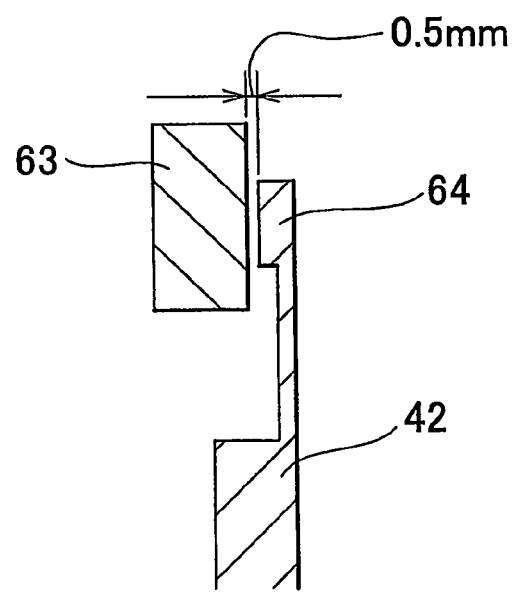
FIG. 19 is an enlarged sectional view of a portion of a multi-cell module of a fuel cell assembly in Embodiment 9 of the invention.
Figure 20:
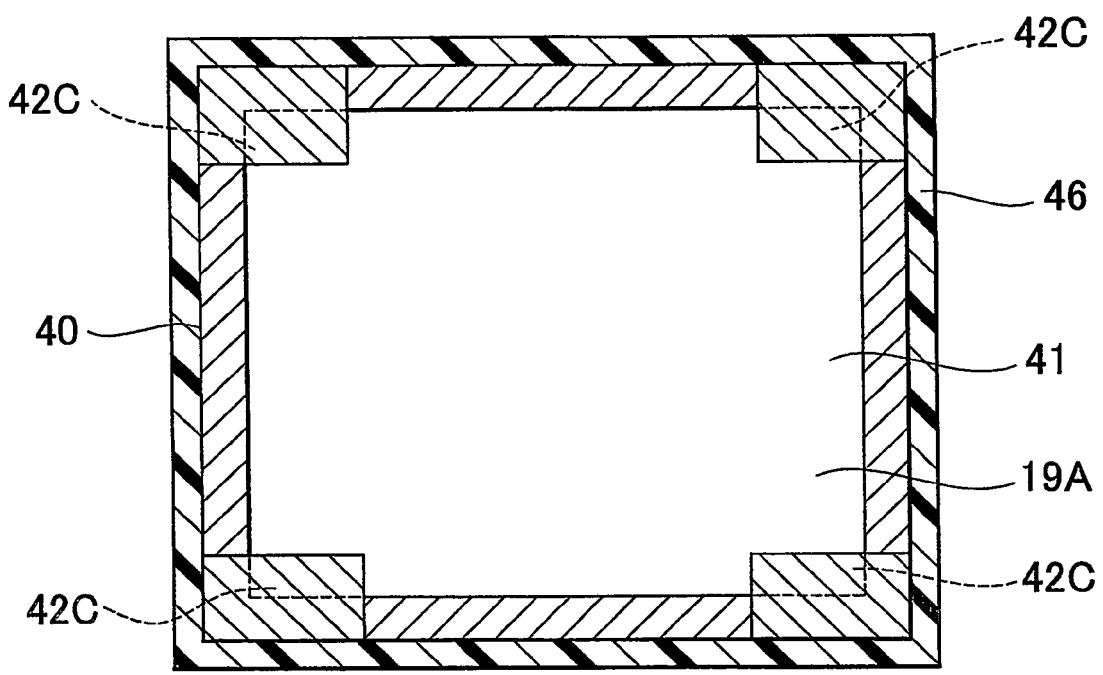
FIG. 20 is a sectional view of a multi-cell module of a fuel cell assembly in Embodiment 10 of the invention.
Figure 21:
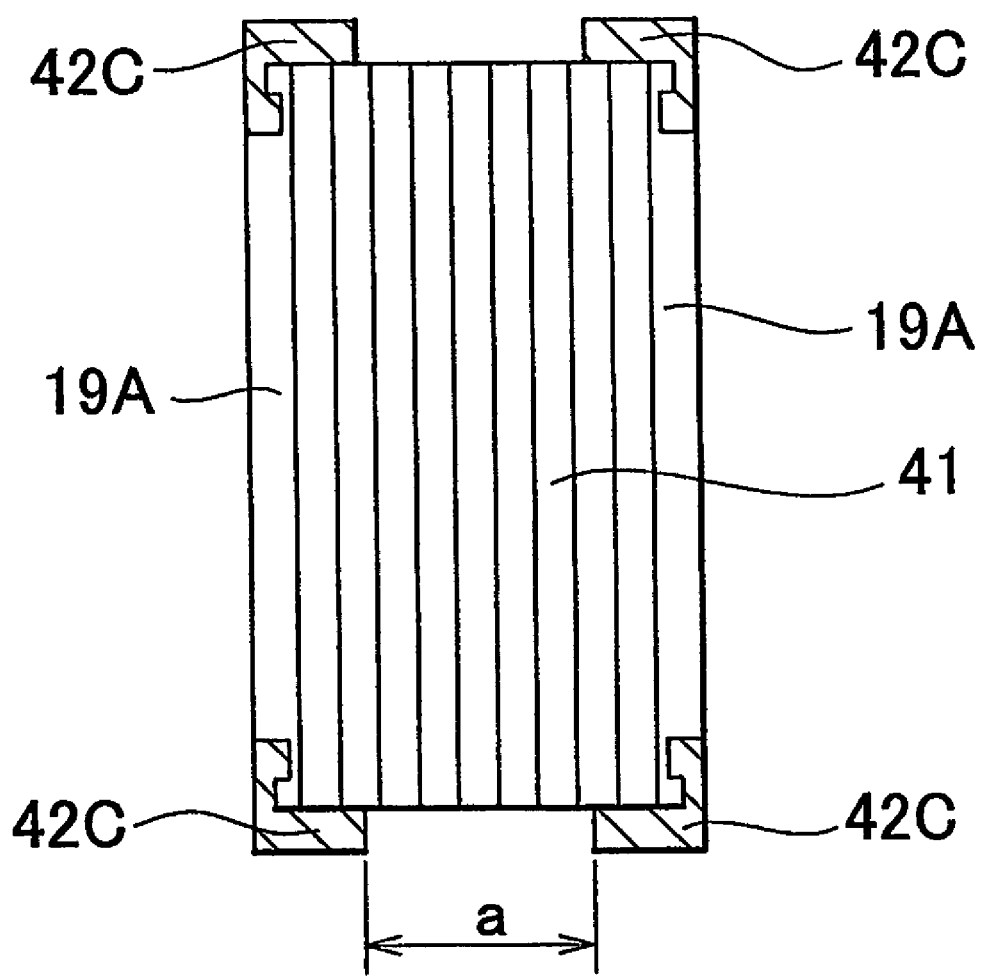
FIG. 21 is a sectional view of a multi-cell module of a fuel cell assembly in Embodiment 10 of the invention which is taken in a direction perpendicular to the direction of the sectional view of FIG. 20.
Figure 22:
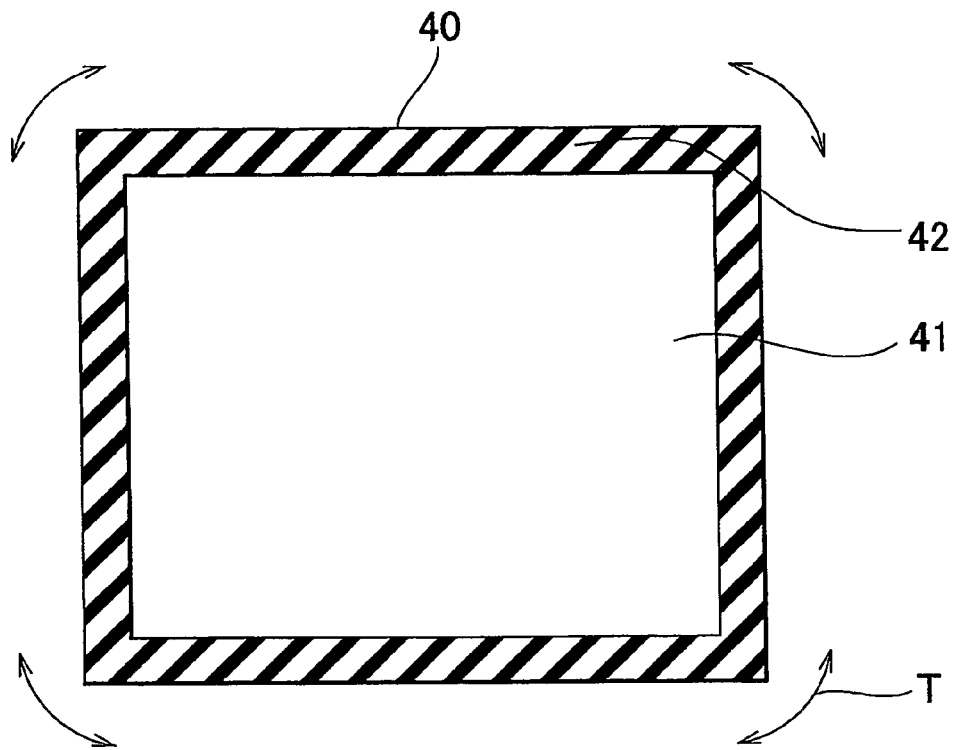
FIG. 22 is a sectional view of a module frame (which is formed entirely of rubber) of a multi-cell module of a fuel cell assembly in Embodiment 11 of the invention.
Figure 23:
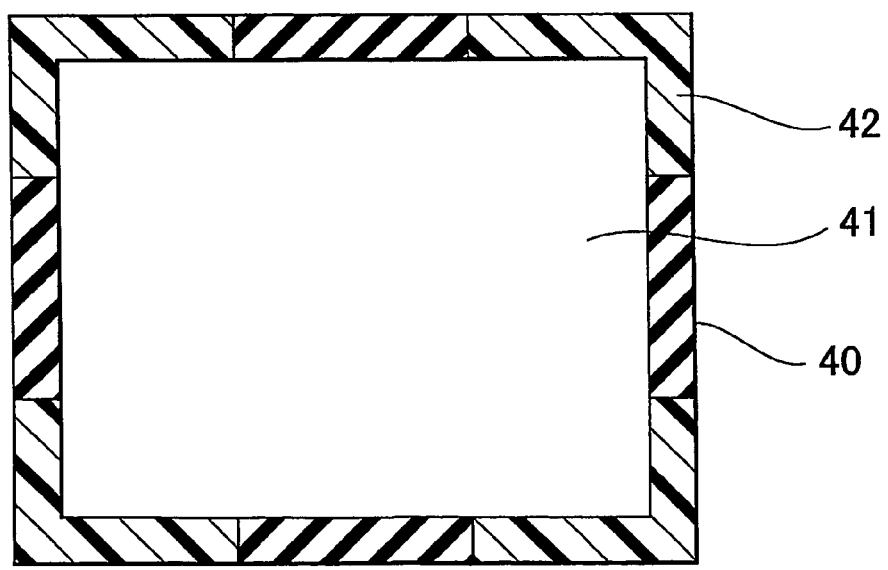
FIG. 23 is a sectional view of a module frame (which is formed partially of rubber) of a multi-cell module of a fuel cell assembly in Embodiment 11 of the invention.
Figure 24:
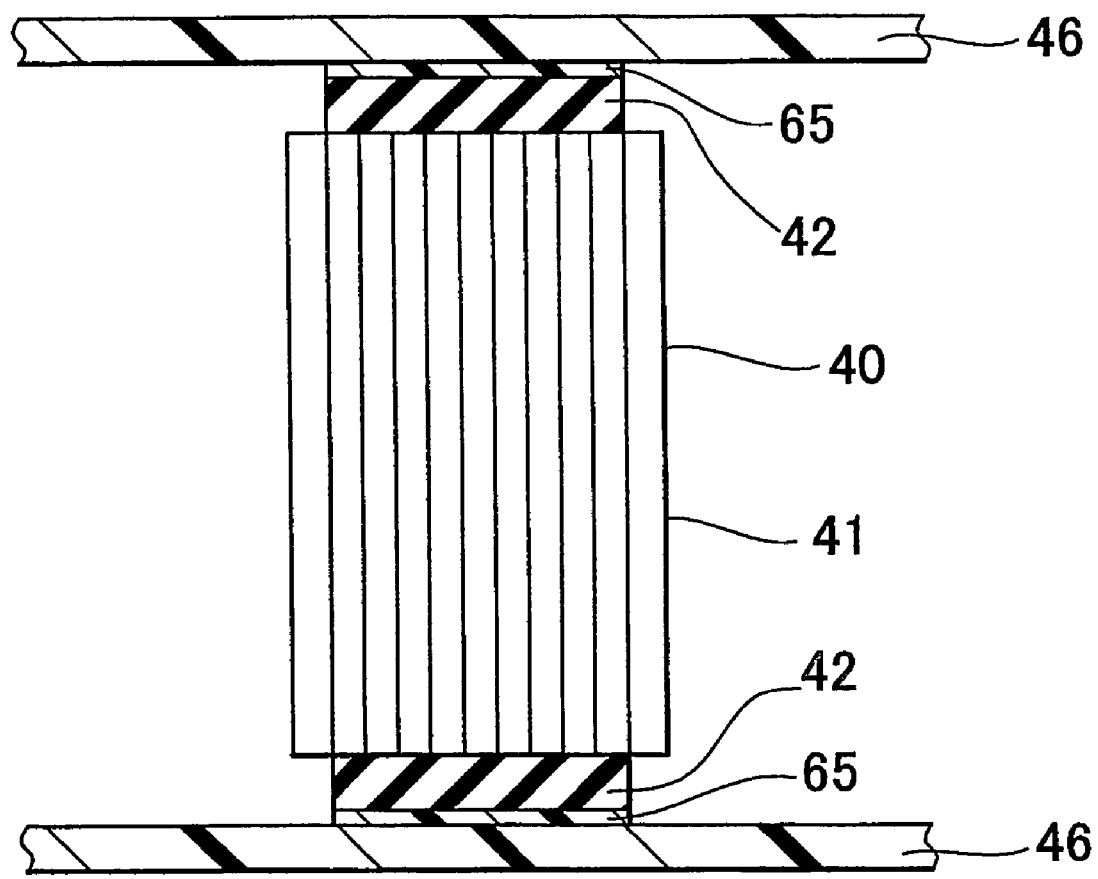
FIG. 24 is a sectional view of a multi-cell module of a fuel cell assembly in Embodiment 12 of the invention.
Figure 25:
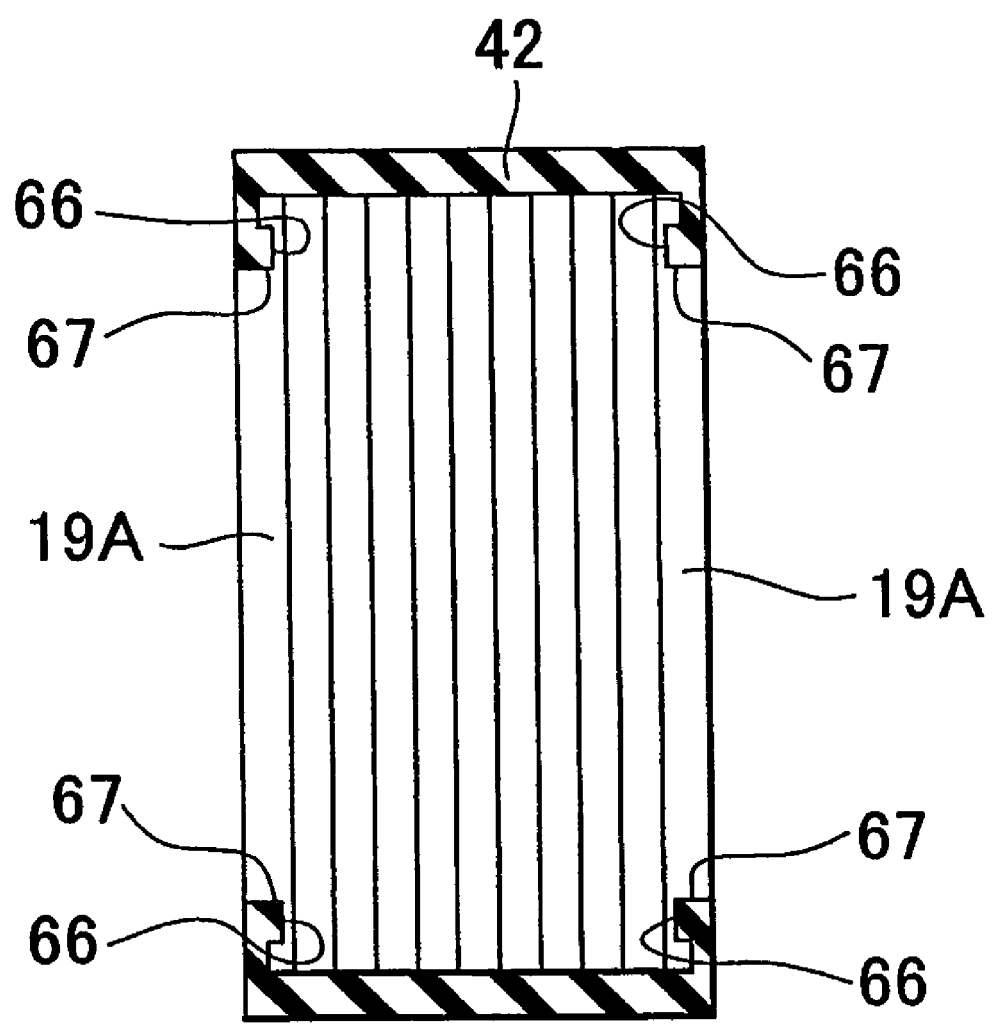
FIG. 25 is a sectional view of a module frame of a multi-cell module of a fuel cell assembly in Embodiment 13 of the invention.
Figure 26:
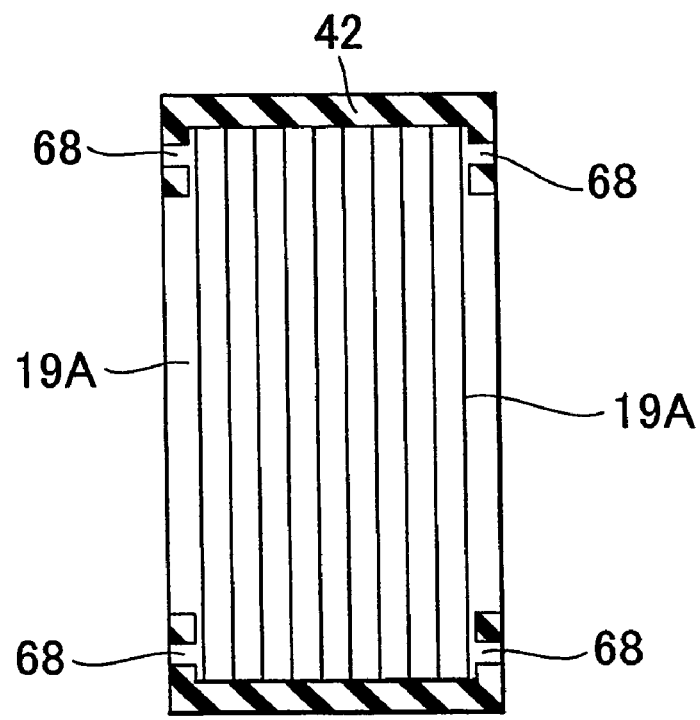
FIG. 26 is a sectional view of a module frame of a multi-cell module of a fuel cell assembly in Embodiment 13 of the invention (the projection-and-depression pattern of the portions for fixture to the end cells is inverse to the projection-and-depression pattern shown in FIG. 25).
Figure 27:
FIG. 27 is a front elevation of an end cell-fixing portion of the module frame shown in FIG. 26.
Figure 28:
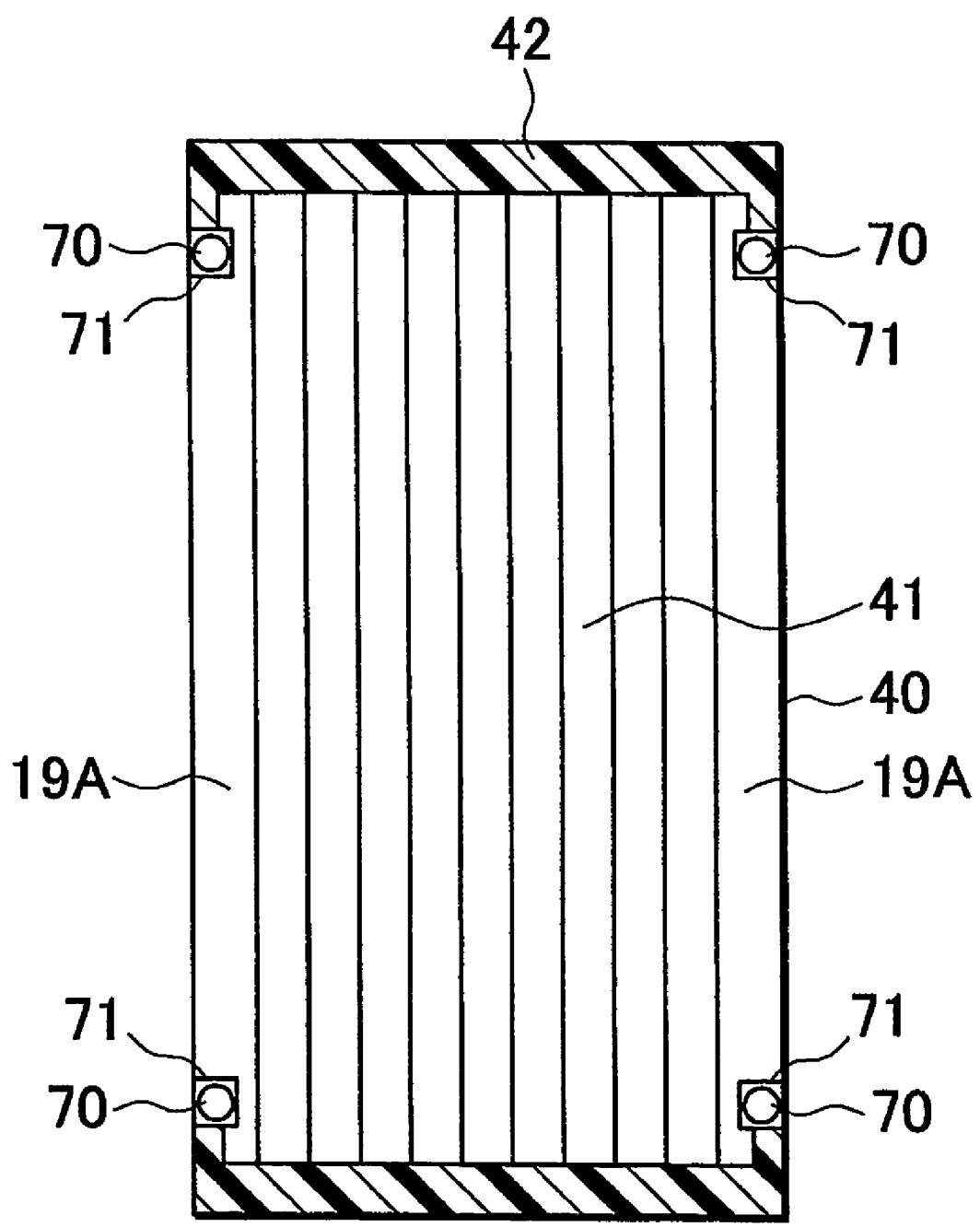
FIG. 28 is a sectional view of a multi-cell module of a fuel cell assembly in Embodiment 14 of the invention.
Figure 29:
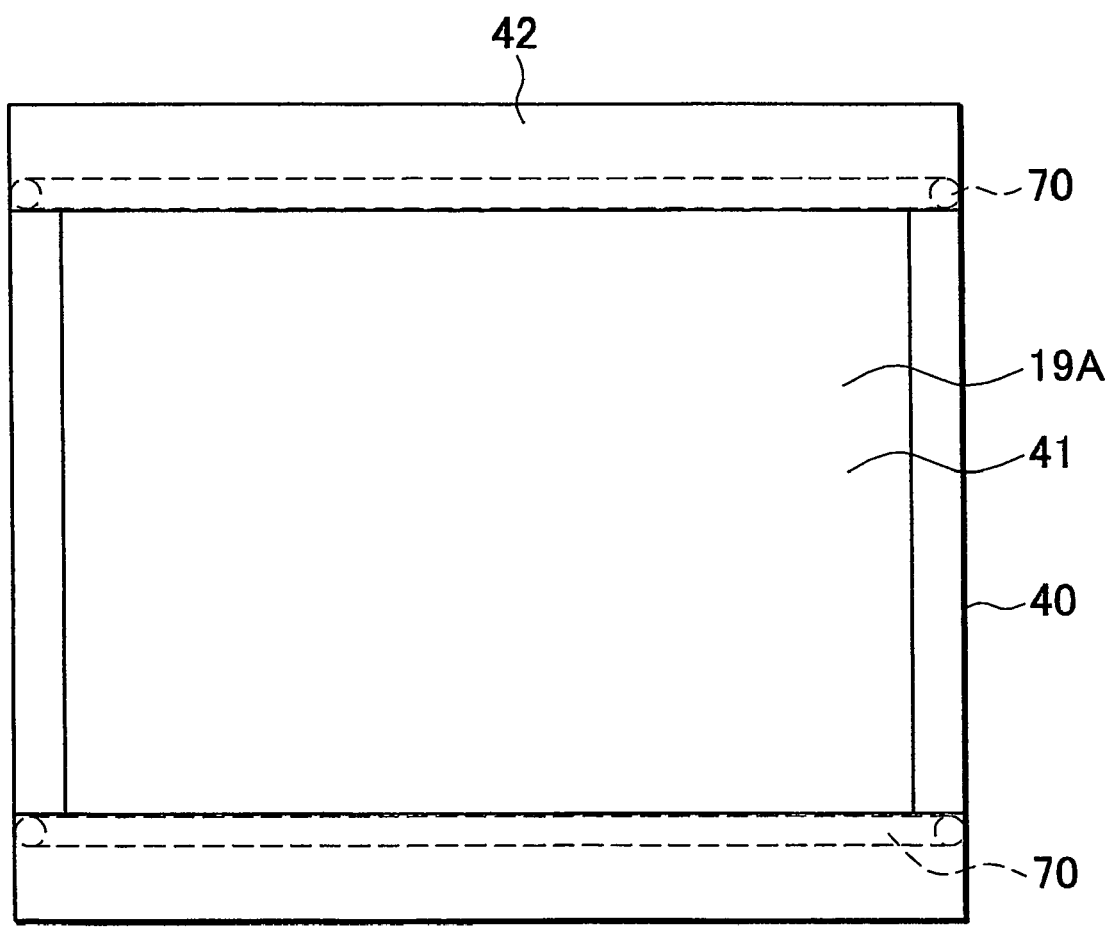
FIG. 29 is a front elevation of a multi-cell module of a fuel cell assembly in Embodiment 14 of the invention.
Figure 30:
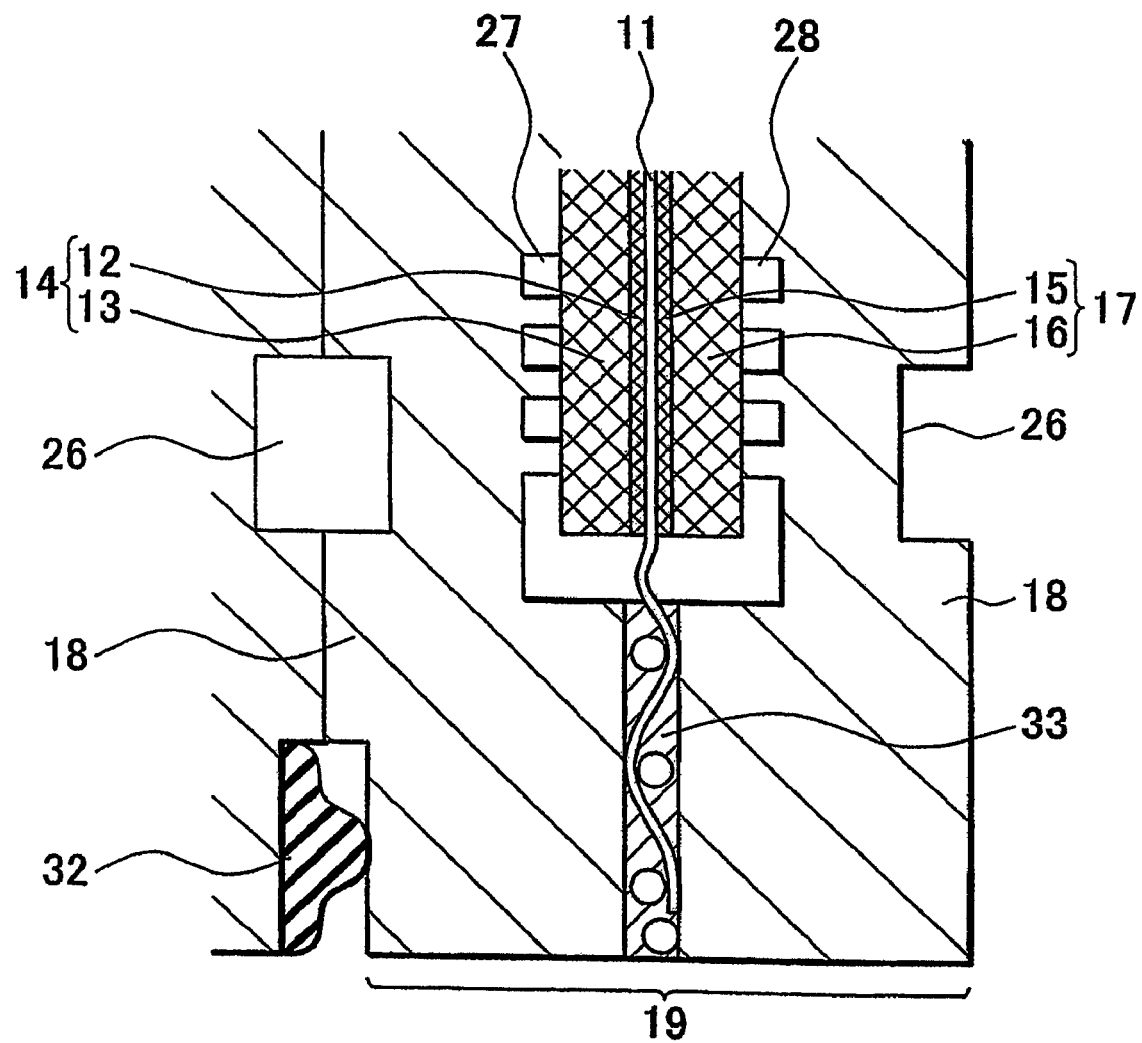
FIG. 30 is a sectional view of a cell of a fuel cell assembly.

Fuel cell batteries in accordance with the invention will be described hereinafter with reference to FIGS. 1 to 29 and FIG. 30. A cell construction shown in FIG. 30 is similar to the related-art cell construction. FIGS. 1 to 4 show Embodiment 1 of the invention. FIG. 5 shows Embodiment 2 of the invention. FIG. 6 shows Embodiment 3 of the invention. FIGS. 7 to 9 show Embodiment 4 of the invention. FIG. 10 shows Embodiment 5 of the invention. FIG. 11 shows Embodiment 6 of the invention. FIGS. 12 to 15 show Embodiment 7 of the invention. FIGS. 16 and 17 show Embodiment 8 of the invention. FIGS. 18 and 19 show Embodiment 9 of the invention. FIGS. 20 and 21 show Embodiment 10 of the invention. FIG. 22 and 23 show Embodiment 11 of the invention. FIG. 24 shows Embodiment 12 of the invention. FIGS. 25 to 27 show Embodiment 13 of the invention. FIG. 28 and 29 show Embodiment 14 of the invention. The construction shown in FIG. 27 is applicable to any one of the embodiments of the invention. Portions common or similar among all the embodiments of the invention disclosed herein are represented by the same reference characters in the entire description of the embodiments of the invention.

Firstly, portions common or similar among all the disclosed embodiments of the invention will be described with reference to, for example, FIGS. 1 to 4 and FIG. 9.

A fuel cell assembly in accordance with the invention is a low-temperature type fuel cell assembly, for example, a polymer electrolyte fuel cell assembly 10. The fuel cell assembly 10 is installed in, for example, a fuel cell motor vehicle. However, the fuel cell assembly 10 may be used for purposes other than motor vehicles.

As shown in FIG. 30, the polymer electrolyte fuel cell assembly 10 is formed by a stack of membrane-electrode assemblies (MEAs) and separators 18. The stacking direction is not limited to the vertical or horizontal directions, but may be any direction.

Each membrane-electrode assembly includes an electrolyte membrane 11 having an ion exchange membrane, an electrode (anode) 14 having a catalytic layer 12 disposed on a surface of the electrolyte membrane 11, and an electrode (cathode) 17 having a catalytic layer 15 disposed on another surface of the electrolyte membrane 11. Anode-side diffusion layers 13 and cathode-side diffusion layers 16 are provided between the membrane-electrode assemblies and the separators 18.

The separators 18 may be any of carbon separators, metal separators, electrically conductive resin separators, combinations of metal separators and resin frames, and combinations of the foregoing separators and frames.

Each separator 18 has reactive gas channels 27, 28 (a fuel gas channel 27, oxidizing gas channel 28) for supplying a fuel gas (hydrogen) and an oxidizing gas (oxygen, or air in ordinary cases) to the anode 14 and the cathode 17, and further has in a reverse surface thereof a coolant channel 26 for passing a coolant (cooling water in ordinary cases).

Coolant manifolds 29, fuel gas manifolds 30 and oxidizing gas manifolds 31 extend through the separators 18. The manifolds 29, 30, 31 are supplied with their respective fluids (coolant, fuel gas, oxidizing gas) from fluid supply pipes. The fluids flow from inlet sides of the manifolds 29, 30, 31 into cell channels 26, 27, 28, and flow out of the cell channels 26, 27, 28 into outlet sides of the manifolds 29, 30, 31, and then exit from fluid discharge pipes. The fluid supply pipes and the fluid discharge pipes connected to a stack 23 are provided at an end side of the stack 23 in the cell stacking direction.

Theses fluid channels are separately sealed by seal members 32, 33 so as to prevent the fluids from mixing with one another and from leaking to the outside. In the example illustrated, the seal member 32 is a rubber gasket 32 (that may be used as an adhesive seal), and the seal member 33 is an adhesive seal 33 (that is also termed seal adhesive).

A unit cell 19 is formed by sandwiching an MEA between separators 18. A plurality of unit cells 19 (e.g., at least five cells and, preferably, 10 to 30 cells) are stacked and adhered to one another by an adhesive (the above-described adhesive seal 33) so as to form a multi-cell assembly 41. Multi-cell assemblies 41 and module frames 42 constitute multi-cell modules 40. The multi-cell modules 40 are arranged in series in the cell stacking direction. Each of two opposite ends of the multi-cell modules 40 arranged in series in the cell stacking direction is provided with a terminal 20, an insulator 21 and an end plate 22. The entire plurality of multi-cell modules 40 arranged in series is clamped in the cell stacking direction, and is fixed by bolts and nuts 25 and an external member 24 extending outside the multi-cell modules 40 and over all the multi-cell modules 40 in the cell-stacking direction. In this manner, a fuel cell stack 23 is formed.

An external member 24 is, for example, a casing, and serves also as a conventional tension plate 24, and is therefore represented by the same reference numeral 24 as the tension plate.

Therefore, the fuel cell assembly 10 of the invention includes a plurality of multi-cell modules 40 arranged in series in the cell stacking direction, and the external member 24.

The multi-cell modules 40 include multi-cell assemblies 41 each formed by stacking a plurality of cells, and a module frame 42 having a first wall 43 that surrounds the multi-cell assemblies 41 and that extends in the cell stacking direction of the multi-cell assemblies 41.

The external member 24 extends outside the multi-cell modules 40 and over all the multi-cell modules 40 in the cell stacking direction.

As for division of the fuel cell stack 23 into multi-cell modules 40, the number of multi-cell modules 40 in the stack 23 is ten if one multi-cell module is formed by twenty cells while the stack has 200 cells.

In the multi-cell module 40, the multi-cell assemblies 41 thereof are not restrained by the module frame 42 in the cell stacking direction, so that thermal expansions of the cells 19 in the cell stacking direction can be relieved.

Preferably, the cells 19 of the multi-cell module 40 are adhered to one another. The cells 19 of multi-cell modules 40 adjacent to each other are not adhered to each other.

However, it is not essential that the cells 19 in the multi-cell module 40 be adhered to one another.

If the cells of the multi-cell module 40 are adhered to one another, the adhesion is accomplished by the channel-sealing adhesive 33 (FIG. 30) without using rubber gaskets 32 (FIG. 30). In that case, the sealing that would be accomplished by rubber gaskets 32 is accomplished by the adhesive 33.

In order to relieve thermal expansions of the cells 19 of the multi-cell module 40 which occur in directions perpendicular to the cell stacking direction, spaces are formed or deformable adhesive members 45 are provided between external surfaces of the multi-cell assemblies 41 of the multi-cell module 40 and an internal surface of the first wall 43 of the module frame 42.

While each cell 19 produces heat from its power generating portion, the first wall 43 does not produce heat but is affected by ambient temperature via the external member 24. Therefore, thermal expansion differences occur between the cells 19 and the first wall 43. Such thermal expansion differences can be relieved owing to the provision of spaces between the cells 19 and the first wall 43 or the provision of deformable adhesive members 45 in the spaces. It is to be noted that adjacent multi-cell modules 40 are provided with an intervening space extending in the cell stacking direction between the first walls 43 and between the adhesive members 45 so that the adhesive members 45 can freely thermally expand or deform in the cell stacking direction and therefore can deform in directions perpendicular to the cell stacking direction.

An external restrainer member 46 is provided between an internal surface of the external member 24 and external surfaces of the first walls 43 of the multi-cell modules 40. It is desirable that the external restrainer member 46 be formed of a deformable material so as to absorb differences in thermal expansion in a direction perpendicular to the cell stacking direction between the external surface of each first wall 43 and the internal surface of the external member 24. Examples of such a deformable material include a resin, a glass-mixed epoxy material, etc. The material of the external restrainer member 46 is not limited to resins or glass-mixed epoxy members.

Since the external restrainer member 46 is disposed between the external surface of each first wall 43 and the internal surface of the external member 24, the inertia force that acts on the multi-cell modules 40 upon a vehicle collision or the like can be received by the external member 24. The external restrainer member 46 is formed of a deformable material, so as to absorb differences in thermal expansion in directions perpendicular to the cell stacking direction between the external surface of each first wall 43 and the internal surface of the external member 24.

A spring box 47 is disposed in series in the cell stacking direction with respect to the plural multi-cell modules 40 disposed in series in the cell stacking direction. A spring force (constant load) of the spring box 47 is exerted on each one of the multi-cell modules 40 in the cell stacking direction. The spring box 47 has a plurality of screws 48 that are arranged in parallel with each other. The spring box 47 is provided in an end portion of the stack 23 opposite from the end portion of the stack 23 to which the supply and discharge pipes are connected. The spring box 47 is disposed between the insulator 21 and the end plate 22. The spring force of the spring box 47 can be adjusted by an adjust screw 49 provided between the spring box 47 and the end plate 22. The spring box 47 may be omitted.

Each module frame 42 may have a second wall 44 that extends in directions perpendicular to the cell stacking direction and that has rigidity in directions perpendicular to the cell stacking direction, in addition to the first wall 43 extending in the cell stacking direction. The second wall 44 may be omitted.

Figure 1:
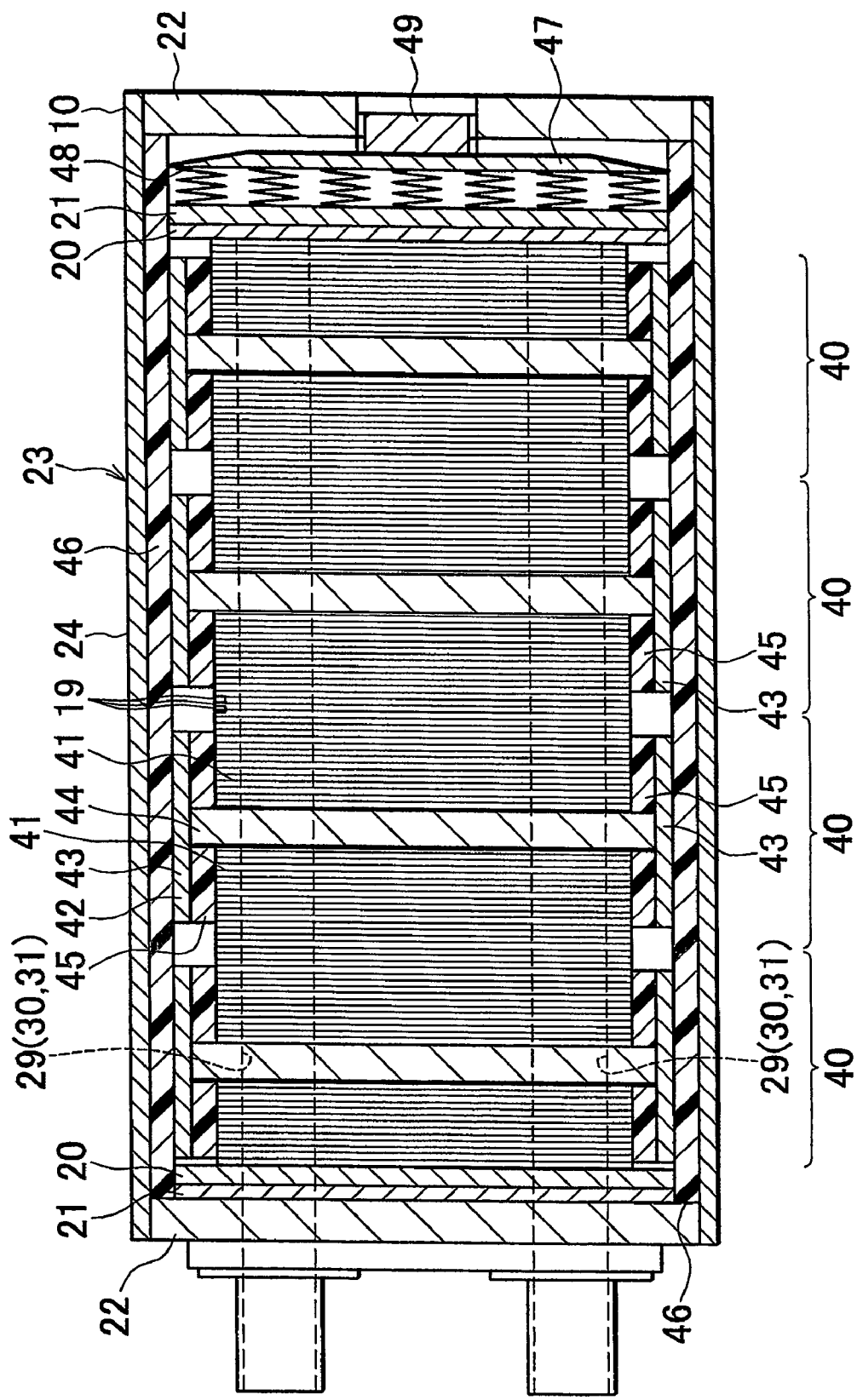
FIG. 1 is a sectional view of a cell stack of a fuel cell assembly in Embodiment 1 of the invention.
Figure 2:
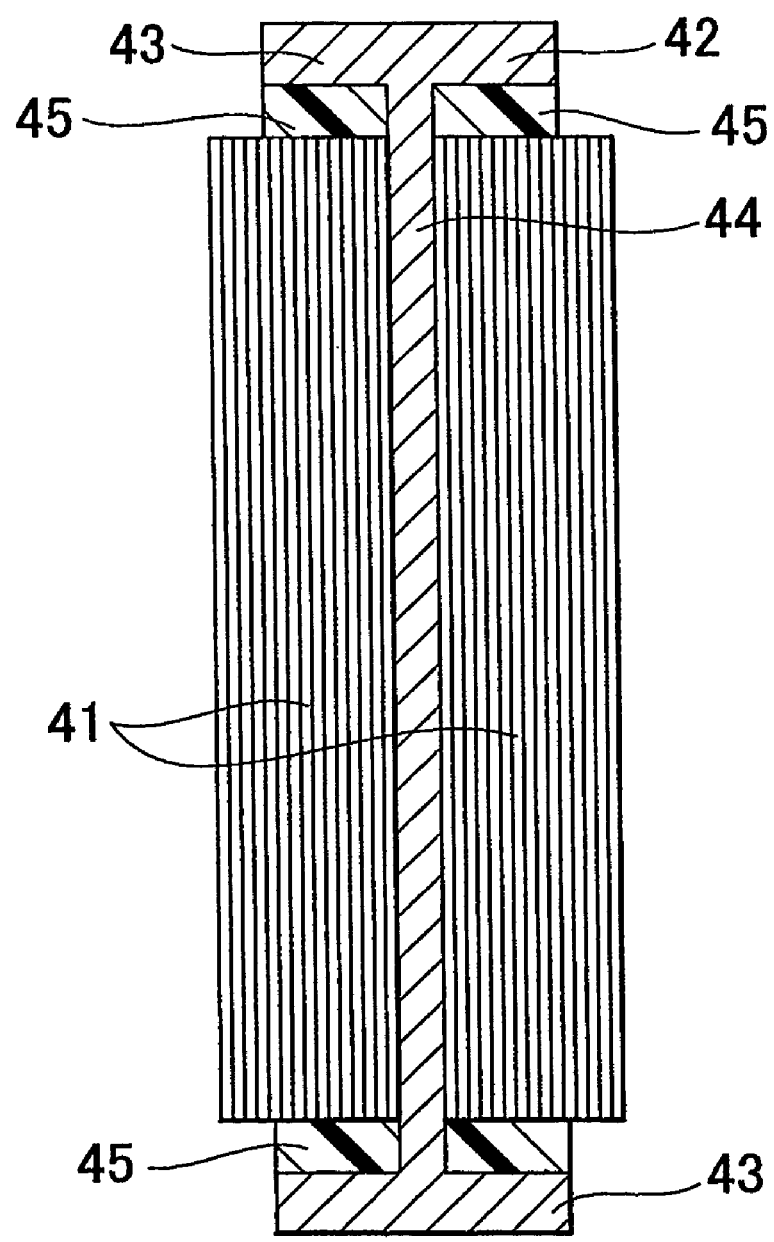
FIG. 2 is a sectional view of a multi-cell module of a fuel cell assembly in Embodiment 1 of the invention.
Figure 3:
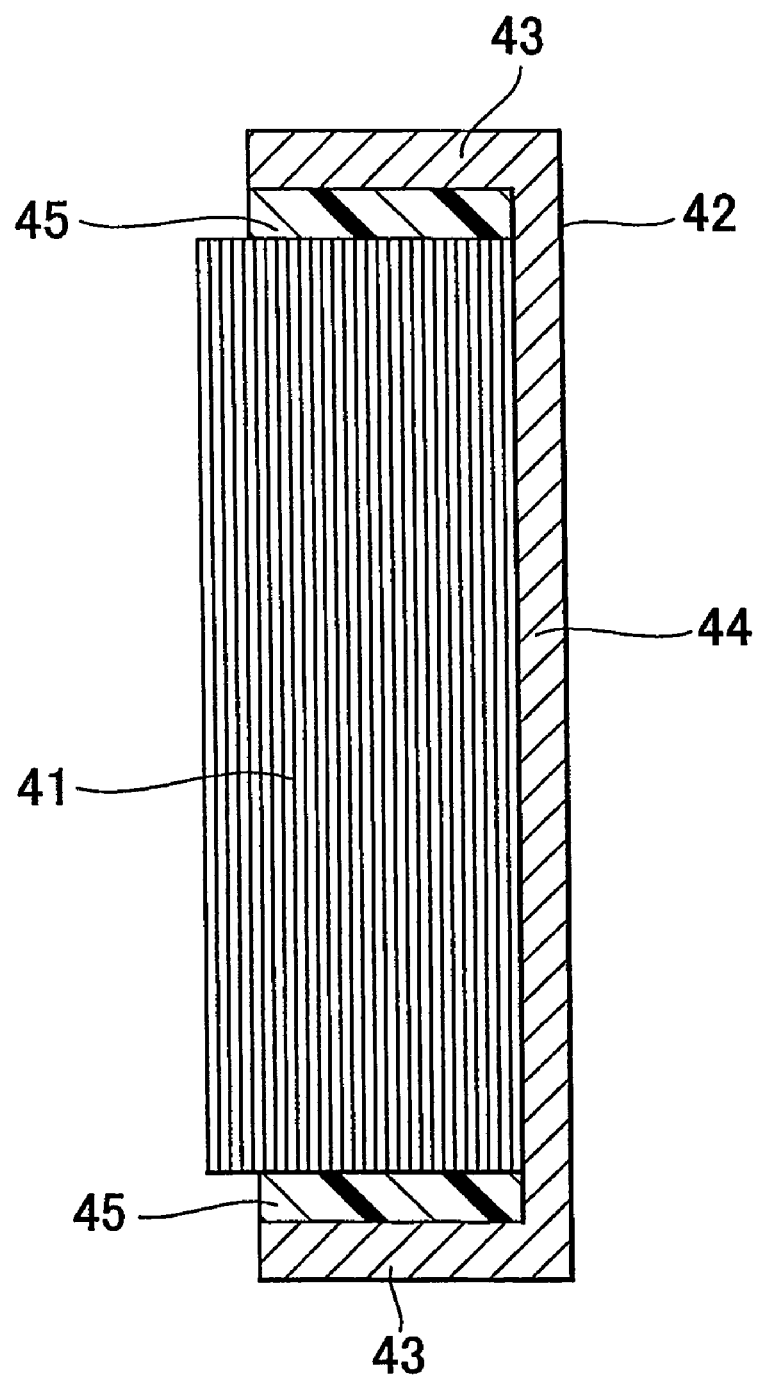
FIG. 3 is a sectional view of another multi-cell module of a fuel cell assembly in Embodiment 1 of the invention.
Figure 4:
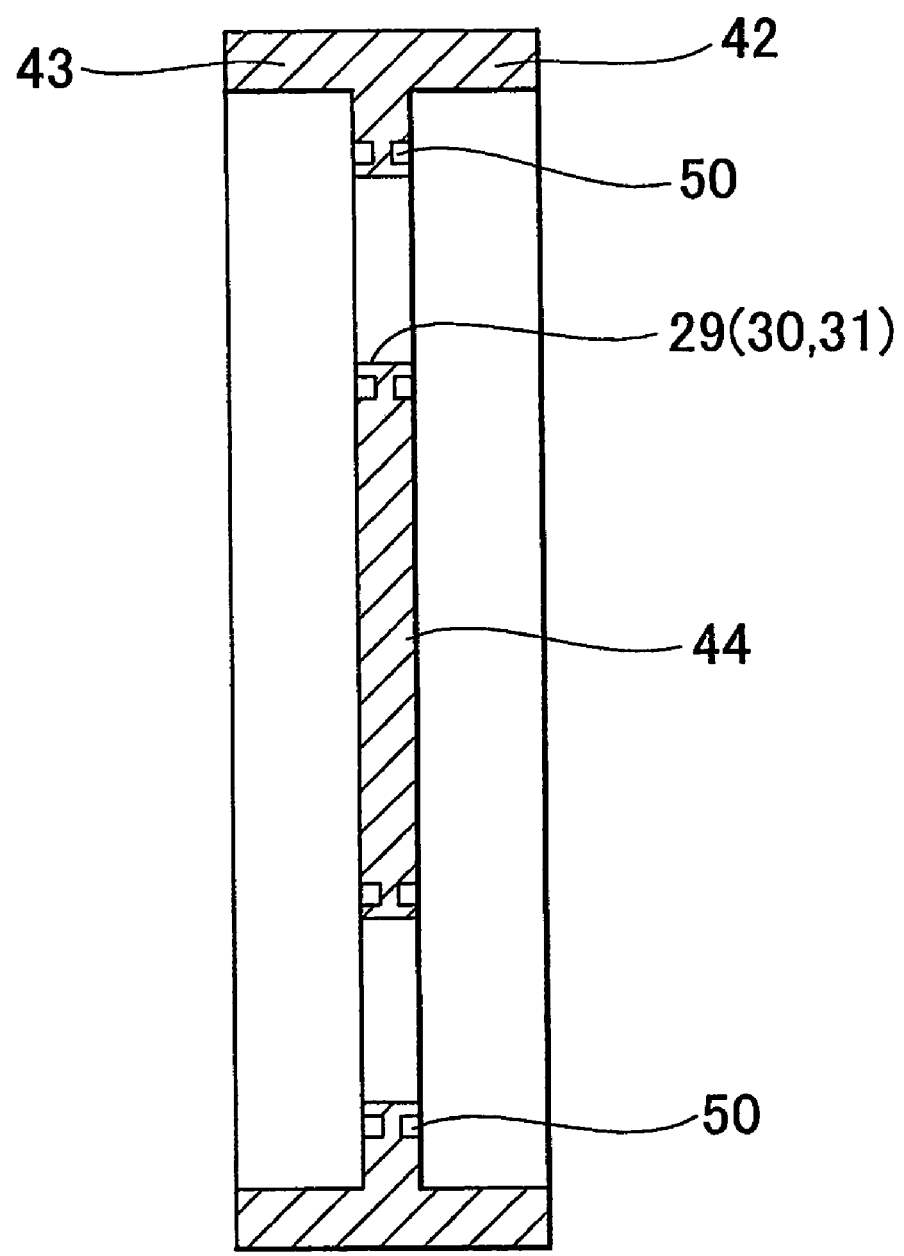
FIG. 4 is a sectional view of a module frame of the multi-cell module shown in FIG. 2.

If the module frame 42 of a multi-cell module 40 has a second wall 44, the multi-cell module 40 may have a construction as shown in FIG. 2 in which two multi-cell assemblies 41 are disposed on opposite sides of the second wall 44 in the cell stacking direction, or may have a construction as shown in FIG. 3 in which a multi-cell assembly 41 is disposed on a side of the second wall 44 in the cell stacking direction.

If a module frame 42 has a second wall 44, the second wall 44 needs to have electrical conductivity. As for the first wall 43, electrical conductivity is purely optional.

Next, operation and advantages of portions common among all the embodiments of the invention disclosed herein will be described.

In the related-art fuel cell assembly shown in FIG. 30, the lateral force on the cell stack is supported only at the two opposite ends thereof. If, upon an impact, the cell stack having a total weight of M receives a lateral acceleration of $\alpha$, a lateral force of $M\alpha$ acts on the entire cell stack, and therefore a shearing force of $M\alpha/2$ acts on the modules at the two opposite ends of the cell stack.

In contrast, in the case of the fuel cell assembly 10 of the invention, the stack 23 is divided into a plurality of multi-cell modules 40, and an arrangement is provided such that the lateral force on the multi-cell module 40 is received in directions perpendicular to the cell stacking direction by the external member 24. Therefore, the multi-cell module 40 receives a lateral force of $M\alpha/n$ where M is the total weight of the cell stack, and $\alpha$ is the lateral acceleration that occurs upon an impact, and n is the number of the multi-cell modules in the stack 23. If this lateral force is supported at the two opposite ends of the multi-cell module, the shearing force becomes Mα/(2n). Thus, the fuel cell assembly 10 of the invention is capable of withstanding impacts of great gravity in lateral directions.

Unlike the related art, the spring force exerted on the multi-cell modules 40 in the cell stacking direction does not need to be as great as a force that produces a friction force that overcomes the shearing force of Mα/2, but may be as small as a force that is needed in order to reduce electrical contact resistance. Thus, the spring force exerted in the cell stacking direction can be reduced from the related-art level. As a result, the amounts of creep in the MEAs and the diffusion layers reduce.

Furthermore, since the stack 23 is divided into a plurality of multi-cell modules 40, the amounts of displacement of the MEAs and the like in the cell stacking direction caused by creep do not concentrate on cells disposed at the two opposite ends of the stack, but spread among the multi-cell modules 40, unlike the related art. Therefore, the amount of displacement of the cells 19 of the multi-cell module 40 in the cell stacking direction reduces considerably, in comparison with the related art. Furthermore, due to the reduced amount of creep achieved by the reduced spring force, the amount of displacement of the cells 19 of the multi-cell module 40 also reduces. Therefore, in the case where each module frame 42 is provided with a first wall 43, the amount of displacement of the multi-cell module 40 in the cell stacking direction relative to the external restrainer member 46 reduces. Hence, even if the MEAs and the like undergo creep, great displacement of the cells 19 of a multi-cell module 40 with respect to the external restrainer member 46 will not occur, and therefore the sticking of cells 19 onto the external restrainer member 46 due to the displacement, which would result in breakage of cells 19, will not occur.

Since the multi-cell assemblies 41 of the multi-cell modules 40 are not restrained in the cell stacking direction by the module frames 42, differences in the thermal expansion in the cell stacking direction between the multi-cell assemblies 41 and the module frames 42 will not cause breakage of cells 19.

If the two opposite ends of the first wall 43 of a module frame 42 are bent toward the side of the multi-cell assemblies 41 so that the bent portions of the first wall 43 restrain the cell-stacking-direction opposite ends of the multi-cell assemblies 41 from moving in the cell stacking direction, a thermal expansion difference in the cell stacking direction between the first wall 43 and the multi-cell assemblies 41 will cause the bent portions of the first wall to strongly press the carbon separators of cells 19, which may result in breakage of the carbon separators. In the invention, however, since the multi-cell modules 40 are not restrained in the cell stacking direction by the module frames 42, the breakage of a carbon separator will not occur.

If cells 19 in a multi-cell module 40 are adhered at their cell surfaces to one another, at least a portion of the inter-cell shearing force that occurs when a lateral force of an impact, such as a vehicle collision or the like, acts on the multi-cell module 40, is borne by the adhesive strength as well. Furthermore in the invention, the shearing force is small as mentioned above, so that it is relatively easy to cope with lateral impact of great gravity. Furthermore, in a construction in which cells are adhered to one another with their external surfaces being aligned (without projections or depressions), the sticking of cells 19 to the adhesive members 45 and the breakage of cells 19 will not occur if, due to the creep of MEAs and the like, a cell external surface undergoes a relative displacement in the cell stacking direction relative to the adhesive members 45 (i.e., the adhesive members 45 being provided between the cell external surfaces and the first walls 43 of the module frames 42).

In the case where spaces are formed or deformable adhesive members 45 are provided between the external surfaces of the multi-cell assemblies 41 of the multi-cell module 40 and the internal surfaces of the first wall 43 of the module frame 42 of the multi-cell module 40, the creep displacements and thermal expansions of cells 19 in directions perpendicular to the cell stacking direction relative to the module frames 42 and the adhesive members 45 can be relieved without causing the cells 19 and the module frame 42 or the adhesive members 45 to stick to each other (or can be relieved by deformation of the adhesive members 45 if cells 19 should stick to the module frame 42 or the adhesive members 45).

Since the external restrainer member 46 is provided between an internal surface of the external member 24 and external surfaces of the first walls 43 of the module frames 42 of the multi-cell modules 40, the lateral force of an impact on the multi-cell modules 40 can be reliably borne by the external member 24. The temperature of the external member 24 is affected by the ambient temperature, and the temperature of the multi-cell modules 40 is affected by heat produced during power generation performed by the cells 19. Therefore, there is a temperature difference therebetween, and there is therefore a difference in the thermal expansion therebetween. However, the difference in the thermal expansion between the external member 24 and the multi-cell modules 40 can be relieved by deformation of the external restrainer member 46.

In the case where the multi-cell modules 40 are arranged in series in the cell stacking direction and the spring box 47 is arrange in series in the cell stacking direction with respect to the multi-cell modules 40 arranged in series, if the stack 23 is divided into a plurality of multi-cell modules 40, constant load of spring force of the spring box 47 can be caused to act on all the multi-cell modules 40 of the stack 23. Furthermore, since the spring 48 is used to impose a constant load on the multi-cell modules 40 in the cell stacking direction, thermal expansions or creep deformations of the multi-cell modules 40, if any occur, can be absorbed by the spring 48, substantially without a change in the constant load.

Next, portions unique to individual embodiments of the invention will be described.

In Embodiment 1 of the invention, each module frame 42 has a first wall 43 that extends in the cell stacking direction, and a second wall 44 that extends in directions perpendicular to the cell stacking direction, as shown in FIGS. 1 to 4. The second wall 44 is formed of a material that has electrical conductivity, for example, a metal material such as SUS or the like. The first wall 43 may be formed of either an electrically conductive material or a non-conductive material. For example, the first wall 43 may be formed of a resin or a metal material such as SUS or the like. The outer peripheral surface of the second wall 44 and the inner peripheral surface of the first wall 43 are connected, or are integrally formed together.

The second wall 44 of each module frame 42 is penetrated by fluid manifolds, such as the coolant manifolds 29, the fuel gas manifolds 30, the oxidizing gas manifolds 31, etc.

The second wall 44-adjacent separators of the multi-cell assembly 41 may be adhered to the adjacent second wall 44 by a seal adhesive, or may be sealed with the second wall 44 via an O-ring 50 without adhesion to the second wall 44.

The operation and advantages of Embodiment 1 of the invention will be described. At least a portion of the lateral force of an impact that occurs on the multi-cell assemblies 41 is transferred to the first walls 43 via the second walls 44, and is received from the first walls 43 by the external member 24 via the external restrainer member 46. In the case where the adhesive members 45 exist between the external surfaces of the multi-cell assemblies 41 and the internal surfaces of the first walls 43, a portion of the lateral force of an impact occurring on the multi-cell assemblies 41 is transferred to the first walls 43 via the adhesive members 45.

If a lateral force enters from outside, the lateral force from the external member 24 enters the first walls 43 via the external restrainer member 46. Since this load is borne by the second walls 44, substantially no external load enters the multi-cell assemblies 41. Furthermore, since the first walls 43 spread the load from outside, and therefore reduce the surface pressure on the cells 19, the sticking of the cells 19 to the adhesive members 45 in the cell stacking direction can be prevented even in the case where the adhesive members 45 are provided.

In Embodiment 2 of the invention, as shown in FIG. 5, a coolant passageway 51 is formed in the second wall 44 of each module frame 42. The coolant passageway 51 is connected in communication with the coolant manifolds 29. The cell-contacting surfaces of each second wall 44 are formed of an electrically conductive material.

The coolant passageway 51 can easily be formed by forming a coolant channel in one of two plates that form a second wall 44, and joining the plate to the other plate. An intended distribution of strongly cooled portions and weakly cooled portions can be achieved in the cell separators that contact the second walls 44 by forming a dense arrangement of passageways in portions of such a separator where strong cooling is desired, and forming a sparse arrangement of channels in portions where weak cooling is desired.

As for the operation and advantages of Embodiment 2 of the invention, the cell-contacting surfaces of the second wall of each module frame are formed of an electrically conductive material, so that electricity can be passed between multi-cell modules. Furthermore, by causing coolant to flow through the coolant passageway 51, it is possible to perform a cooling control (temperature control) of end cells adjacent to the second wall 44 in the multi-cell module 40.

In Embodiment 3 of the invention, as shown in FIG. 6, a coolant passageway 51 is formed in the second wall 44 of each module frame 42. The coolant passageway 51 is connected ill communication to the coolant manifolds 29. The cell-contacting surfaces of the second wall 44 are formed of an electrically conductive material. At least a portion of each cell-contacting surface of the second wall 44 is formed so as to be displaceable in the cell stacking direction. This displaceable structure is formed by, for example, corrugated portions 52 that are formed around a portion of the second wall 44 which is desired to be displaced in the cell stacking direction.

As for the operation and advantages of Embodiment 3 of the invention, at least a portion of each cell-contacting surface is formed so as to be displaceable in the cell stacking direction, so that the cell surface pressure in the cell stacking direction can be controlled. Furthermore, the pressure of coolant can be used to apply a load onto the cells 19 in the cell stacking direction. Therefore, the constant load-providing spring (the spring 48 of the spring box 47) can be omitted. In that case, the stack 23 can be reduced in size by an amount corresponding to the thickness of the spring box 47.

In Embodiment 4 of the invention, as shown in FIGS. 7 to 9, each module frame 42 does not have a second wall 44, but has only a first wall 43.

The multi-cell module 40 has a multi-cell assembly 41 that includes a plurality of cells. The multi-cell assembly 41 is disposed in a space surrounded by the first wall 43 of a module frame 42. In this case, it is desirable that the multi-cell assembly 41 be defined in position within a module frame 42 with reference to two surfaces of the first wall 43, as shown in FIGS. 8 and 9. It is desirable that the cells 19 of the multi-cell assembly 41 be adhered to one another. However, the cells 19 of the multi-cell assembly 41 may be left un-adhered. It is desirable that an adhesive member 45 be provided between an external surface of the multi-cell assembly 41 and an internal surface of the first wall 43 of the module frame 42. Adjacent multi-cell modules are provided with an space that extends in the cell stacking direction between the first walls 43 and between the adhesive members 45.

As for the operation and advantages of Embodiment 4 of the invention, the lateral force of an impact on multi-cell modules 40 (a lateral component of the inertia force of the multi-cell assemblies 41) is borne by the external member 24 via the first wall 43 of each module frame 42 and the external restrainer member 46. Therefore, there is no concentration of shearing force on cells provided at the ends of the stack.

The invention is applicable to the stack structure of fuel cells.

In Embodiment 5 of the invention, as shown in FIG. 10, the external surface of each module frame 42 and the internal surface of the external restrainer member 46 contact each other in a point contact fashion in a view in the direction of an axis. In the axial-direction point contact, at least one of the external restrainer member 46 and each module frame 42, that is, each module frame 42 in FIG. 10, has an outwardly projected protrusion 60 in a central portion thereof in the axial direction. The summit of the protrusion 60 provides contact between the external surface of the module frame 42 and the internal surface of the external restrainer member 46. The protrusion 60 may have a generally triangular sectional shape with a pointed vertex, or may also have an arcuate or round sectional shape with a pointed vertex, as shown in FIG. 10.

The "point contact fashion in a view in the direction of an axis" in the foregoing description includes a case of point contact where the contact is a line contact in a direction perpendicular to the axial direction. It may be one of the external surface of each module frame 42 and the internal surface of the external restrainer member 46 or both of them that have protrusions 60.

The operation and advantages of Embodiment 5 of the invention are as follows.

In the case where multi-cell modules 40 are stacked, the entire length L of a module frame 42 increases with increases in the number of cells provided in a corresponding multi-cell module 40. When multi-cell modules 40 are stacked, the end cell surfaces B of adjacent multi-cell modules 40 meet. Although it is desirable that the external surface A of each module frame 42 be perpendicular to the surfaces B, a reality is that there are certain variations in the angle between the surfaces A and B due to assembly errors and the like. In order to allow for such variations, it is necessary to provide a clearance C between the external surface of each module frame 42 and the internal surface of the external restrainer member 46. The clearance C needs to be increased with increases in the total length of a module frame 42. An increased clearance C gives rise to a problem of increased likelihood of multi-cell modules 40 shifting along surfaces B in directions perpendicular to the cell stacking direction upon an impact. In contrast, a reduced clearance C gives rise to a problem of inaccurate junction of the end cell surfaces B of adjacent multi-cell modules 40 and variations in the stacking manner.

In Embodiment 5 of the invention, since protrusions 60 are provided for point contact between the external surface of each module frame 42 and the internal surface of the external restrainer member 46, it is possible to achieve both minimization of the clearance C from the distal ends of the protrusions 60 in a space between the external restrainer member 46 and the module frames 42 and reduction of variations in the stacking of multi-cell modules. Therefore, it becomes possible to prepare a stack in which the multi-cell modules 40 are less likely to shift in directions perpendicular to the cell stacking direction upon an impact and in which adjacent multi-cell modules 40 are accurately joined on the end cell surfaces B.

In Embodiment 6 of the invention, as shown in FIG. 11, a module frame 42 has an opening 61 for mounting, on the multi-cell assembly 41, members that electrically connect the multi-cell assembly 41 and an external device, that is, a cell monitor and wirings. The opening 61 may be a hole or a notch. Via the opening 61, a cell monitor is mounted on the cells of the multi-cell assembly 41. Furthermore, the wirings connected to the cell monitor are led out through the opening 61.

As for the operation and advantages of Embodiment 6 of the invention, since the module frames 42 has an opening 61 for installing, on the multi-cell assembly 41, members that electrically connect the multi-cell assembly 41 to an external device, cell monitor wiring can be accomplished even though the multi-cell assembly 41 is covered with the module frames 42.

In Embodiment 7 of the invention, as shown in FIGS. 12 to 15, a module frame 42 is formed of at least two frame members 42a, 43a that are separate from each other or are connected to each other at portions thereof. A space is formed between the frame members 42a, 42b.

Figure 13:
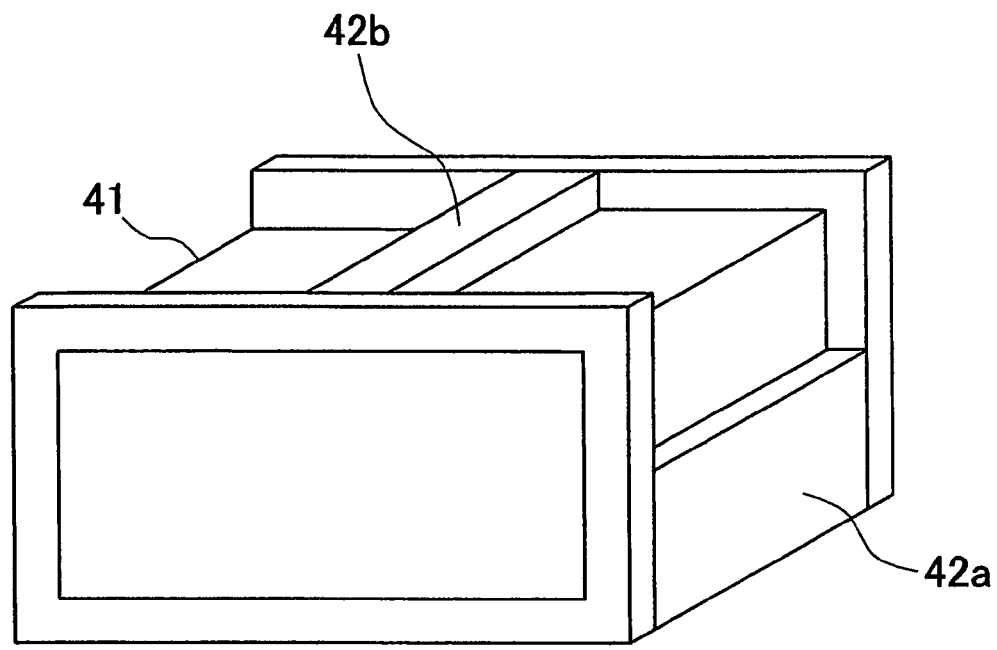
FIG. 13 is a perspective view of a structure for connecting a plurality of frame bodies in a multi-cell module of a fuel cell assembly in Embodiment 7 of the invention.

As shown in FIG. 13, the frame members 42a, 42b are connected to each other at the positions of end cells. Furthermore, as shown in FIG. 14, the frame members 42a, 42b may be connected to each other at an intermediate position in the cell stacking direction of the multi-cell assembly 41. The frame members 42a, 42b may be adhered to the cells of the multi-cell assembly 41 through the use of an adhesive 45 as shown in FIG. 15, instead of being connected to each other.

As for the operation and advantages of Embodiment 7 of the invention, a space exists between the frame members 42a, 42b, so that cell monitor can be mounted onto the cells of the multi-cell assembly 41 via the space, and wirings connected to the cell monitors can be led out via the space.

In Embodiment 8 of the invention, as shown in FIGS. 16 and 17, an internal surface of the module frame 42 has a groove 62 for an adhesive. The number of grooves 62 may be one or more than one. The groove 62 extends in directions perpendicular to the cell stacking direction.

As for the operation and advantages of Embodiment 8 of the invention, the internal surface of the module frame 42 has a groove 62 for an adhesive, so that an adhesive will enter the groove 62 and therefore will be substantially prevented from leaking out. Thus, stable adhesion can be achieved.

In Embodiment 9 of the invention, as shown in FIGS. 18 and 19, a module frame 42 is provided with a cell monitor presser 64 that extends from the module frame 42 to the vicinity of an outer surface of a cell monitor 63. The cell monitor presser 64 is formed integrally with the module frame 42. A small gap, for example, a gap of about 0.5 mm, is provided between the cell monitor presser 64 and the cell monitor 63.

As for the operation and advantages of Embodiment 9 of the invention, the module frame 42 is provided with the cell monitor presser 64 extending from the module frame 42 to the vicinity of the outer surface of the cell monitor 63, so that the cell monitor 63 can be prevented from falling apart from the cells.

In Embodiment 10 of the invention, as shown in FIGS. 20 and 21, at least a portion of a module frame 42 is formed of a non-electrically conductive material, for example, a resin, a rubber or the like.

Furthermore, each rectangular end cell 19A (cell at an end in the stacking direction) of each one of multi-cell assemblies 41 of multi-cell modules 40 has, at its four corner sites, frame members 42c that form the resin-made module frame 42. The frame members 42c are integrated with the end cell 19A. The frame members 42c are separate from cells other than the end-portion cell can be relatively moved even though the multi-cell assembly 41 thermally expands or shrinks in the cell stacking direction. A space a is provided between the frame members 42c of one of the two end cells and the frame members 42c of the other end cell. Therefore, the multi-cell assembly 41 can contract in the cell stacking direction.

As for the operation and advantages of Embodiment 10 of the invention, at least a portion of the module frame 42 is formed of a non-electrically conductive material, so that the separators of the individual cells can be reliably electrically insulated from one another while impact absorption is possible.

Furthermore, the frame members 42c forming the resin-made module frame 42 are disposed at four corner sites of each end cell 19A of each one of multi-cell assemblies 41 of multi-cell modules 40, and are integrated with the end cell 19A, so that the module frame 42 can be reduced in size and weight and can be made compact. Still further, if an end cell 19A and frame members 42c are provided as a pre-formed assembly, the module frame assembling efficiency will improve.

In Embodiment 11 of the invention, as shown in FIGS. 22 and 23, at least a portion of a module frame 42 is formed from an elastic member, for example, a rubber. FIG. 22 shows an example in which a module frame 42 is entirely formed from a rubber. FIG. 23 shows an example in which a portion of a module frame 42, for example, four corner portions of the module frame 42, are formed from a rubber and the rest is formed from a resin.

The operation and advantages of Embodiment 11 of the invention are as follows. That is, if an elastic module frame 42 is formed so that the internal dimensions of the elastic module frame 42 in a free state are smaller by certain amounts than the external dimensions of a multi-cell assembly 41, the module frame 42 will produce a tension T when the module frame 42 is attached to the multi-cell assembly 41. Therefore, it becomes possible to do away with the use of an adhesive for adhering the module frame 42 to a multi-cell assembly 41. The abolishment of the use of adhesive eliminates the need for an adhesive applying facility, and reduces the assembly process time by an amount corresponding to the adhesive hardening time. Furthermore, the elasticity of the rubber enables shock absorption.

In Embodiment 12 of the invention, as shown in FIG. 24, a module frame 42 is formed of an elastic member, for example, a rubber, and the friction coefficient of a surface of this elastic member is made smaller than the friction coefficient of the elastic member itself. The friction coefficient of a surface of the elastic member can be reduced by sticking a high-lubricity resin plate 65, such as a polytetrafluoroethylene plate or the like, to an external surface of the elastic member of the module frame 42 by welding or fitting-in or the like, or by resin-coating.

The operation and advantages of Embodiment 12 of the invention are as follows. The rubber-made module frame 42 and the resin-made external restrainer member 46 provide a great friction coefficient, and therefore do not easily slide on each other. However, the friction coefficient of the surface of the elastic member is made lower than the friction coefficient of the elastic member itself, the rubber-made module frame 42 easily slides on the resin-made external restrainer member 46, thereby preventing a load fall-off of an MEA or the like which is likely to occur if the sliding is not easy.

In Embodiment 13 of the invention, as shown in FIGS. 25, 26 and 27, a module frame 42 is formed from an elastic member, for example, a rubber, and the elastic member-formed module frame 42 is connected to the end cells 19A of a multi-cell assembly 41 of a multi-cell module 40. The connection between the module frame 42 and the end cells 19A is accomplished, for example, by forming grooves 66 in the cell-stacking-direction outer surface of each end cell 19A and fitting protrusions 67 provided on the module frame 42 into the grooves 66 as shown in FIG. 25, or by providing cylindrical protrusions 68 on the cell-stacking-direction outer surface of each end cell 19A and fitting the protrusions 68 into holes 69 formed in the module frame 42 as shown in FIGS. 26 and 27.

As for the operation and advantages of Embodiment 13 of the invention, the module frame 42 can be stably fixed to the end cells 19A. Therefore, the module frame 42 is substantially prevented from falling apart from the multi-cell assembly 41, and tension can be stably applied to the module frame 42 in the cell stacking direction.

In Embodiment 14 of the invention, as shown in FIGS. 28 and 29, a module frame 42 is formed from an elastic member, for example, a rubber, and wires 70 are embedded in the elastic member-formed module frame 42. Preferably, the wires 70 are expandable and contractable wires, and are formed of, for example, rubber, springs, etc. A module frame 42 attached to a multi-cell assembly 41 has, in each one of upper and lower portions of the multi-cell assembly 41, a groove 71 that extends across all the cells of the multi-cell assembly 41. When the module frame 42 is to be attached to the multi-cell assembly 41, the module frame 42 is fitted to the multi-cell assembly 41 while the wires 70 are being pulled. After that, the tension of the wires 70 is removed, so that the wire-embedded portions of the module frame 42 become fitted to the grooves 71.

As for the operation and advantages of Embodiment 14 of the invention, the module frame 42 can be fitted to the multi-cell assembly 41 through a simple operation of fitting the portions of the module frame 42 where the wires 70 are embedded to the grooves 71 by expanding the wire-embedded portions. Due to the structure in which the wire-embedded portions of the module frame 42 are fitted into the grooves 71, the module frame 42, after being fitted, is unlikely to fall apart from the multi-cell assembly 41. Thus, it becomes possible to do away with the use of adhesive for adhering the module frame 42 to the multi-cell assembly 41. The abolishment of the use of adhesive eliminates the need for an adhesive applying facility, and reduces the assembly process time by an amount corresponding to the adhesive hardening time. Furthermore, the elasticity of the rubber enables shock absorption.

What is claimed is:

1. A fuel cell assembly comprising:
   a plurality of multi-cell modules disposed in series and in a stacking direction;
   an external member; and
   an external restrainer member provided along the external member in the stacking direction, which extends between end plates provided at both sides in the cell stacking direction of the plurality of multi-cell modules,
   wherein each multi-cell module of the plurality of multi-cell modules has, a multi-cell assembly formed by stacking a plurality of cells, and a module frame having a first wall that surrounds the multi-cell assembly and that extends in the cell stacking direction of the multi-cell assembly,
   wherein the external member extends outside the plurality of multi-cell modules and in the cell stacking direction along the multi-cell modules,
   wherein the external restrainer member is provided between an internal surface of the external member and an external surface of the first wall of the module frame of the multi-cell module, and contacts the internal surface of the external member and the external surface of the first wall,
   wherein an elastic member is provided between an external surface of each multi-cell module assembly of the plurality of multi-cell modules and an internal surface of the first wall,
   the multi-cell module assembly elastically adheres to the first wall by the elastic member, and
   each multi-cell module assembly of the plurality of multi-cell modules is not restrained by the module frame in the cell stacking direction.

2. The fuel cell assembly according to claim 1, wherein in each multi-cell module, cells of the multi-cell assembly are adhered to one another.

3. The fuel cell assembly according to claim 1, wherein the plurality of multi-cell modules are disposed in series in the cell stacking direction, and a spring box is disposed in series in the cell stacking direction with respect to the plurality of multi-cell modules disposed in series, and a spring force of the spring box is applied to the plurality of multi-cell modules in the cell stacking direction.

4. The fuel cell assembly according to claim 1, wherein the module frame has a second wall that extends in a direction perpendicular to the cell stacking direction, in addition to the first wall.

5. The fuel cell assembly according to claim 4, wherein a coolant passage is formed in the second wall.

6. The fuel cell assembly according to claim 5, wherein a contact surface of the second wall which contacts a cell is formed of an electrically conductive material.

7. The fuel cell assembly according to claim 4, wherein at least a portion of a contact surface of the second wall which contacts a cell is formed so as to be displaceable in the cell stacking direction.

8. The fuel cell assembly according to claim 7, wherein a coolant passage is formed in the second wall, and a portion of the second wall which is displaceable in the cell stacking direction is displaced by a pressure of the coolant passage.

9. The fuel cell assembly according to claim 1, wherein an external surface of each module frame and an internal surface of the external member contact each other in a point contact fashion.

10. The fuel cell assembly according to claim 1, wherein each module frame is provided with an opening for mounting, on the multi-cell assembly, a member that electrically connects the multi-cell assembly to an external device.

11. The fuel cell assembly according to claim 1, wherein each module frame includes at least two frame members that are separate from each other.

12. The fuel cell assembly according to claim 1, wherein an internal surface of each module frame has a groove for an adhesive.

13. The fuel cell assembly according to claim 1, wherein each module frame is provided with a cell monitor presser that extends from the module frame toward an external surface of a cell monitor, wherein the cell monitor presser is located near the cell monitor.

14. The fuel cell assembly according to claim 1, wherein at least a portion of each module frame is formed of a non-electrically conductive material.

15. The fuel cell assembly according to claim 1, wherein frame members that constitute each module frame made of a resin are disposed at four corner sites of an end cell of a multi-cell assembly of the multi-cell module.

16. The fuel cell assembly according to claim 1, wherein the external restrainer member is formed of a deformable material applicable to deform in a direction perpendicular to the cell stacking direction.

17. The fuel cell assembly according to claim 1, wherein the external member is a casing, and wherein the external member also serves as a tension plate.

18. The fuel cell assembly according to claim 1, wherein a space is provided between the module frames.

19. The fuel cell assembly according to claim 18, wherein adjacent first walls are away from each other.

20. A fuel cell assembly comprising:
a plurality of multi-cell modules disposed in series and in a stacking direction;
an external member; and
an external restrainer provided along the external member in the stacking direction, which extends between end plates provided at both sides in the cell stacking direction of the plurality of multi-cell modules,
wherein each multi-cell module of the plurality of multi-cell modules has, a multi-cell assembly formed by stacking a plurality of cells, and a module frame having a first wall that surrounds the multi-cell assembly and that extends in the cell stacking direction of the multi-cell assembly, and
wherein the external member extends outside the plurality of multi-cell modules and in the cell stacking direction along the multi-cell modules, and
wherein the external restrainer member is provided between an internal surface of the external member and an external surface of the first wall of the module frame of the multi-cell module, and contacts the internal surface of the external member and the external surface of the first wall,
wherein an entire or a portion of the module frame is formed of an elastic member,
the multi-cell module assembly is elastically supported by the module frame,
each multi-cell module assembly of the plurality of multi-cell modules is not restrained by the module frame in the cell stacking direction.

21. The fuel cell assembly according to claim 20, wherein a friction coefficient of a surface of the elastic member is smaller than a friction coefficient of the elastic member itself.

22. The fuel cell assembly according to claim 20, wherein each module frame is connected to an end cell of the multi-cell assembly of each multi-cell module.

23. The fuel cell assembly according to claim 20, wherein a wire is embedded in each module frame.

24. The fuel cell assembly according to claim 20, further comprising a member which is disposed on a surface of the elastic member and has a friction coefficient that is smaller than that of the elastic member.

* * * * *

UNITED STATES PATENT AND TRADEMARK OFFICE
CERTIFICATE OF CORRECTION

| | | |
|---|---|---|
| PATENT NO. | : 7,803,474 B2 | |
| APPLICATION NO. | : 10/565102 | |
| DATED | : September 28, 2010 | |
| INVENTOR(S) | : Toshiyuki Inagaki | |

It is certified that error appears in the above-identified patent and that said Letters Patent is hereby corrected as shown below:

| Column | Line | |
|---|---|---|
| 1 | 7 | Change "Jul. 17, 2004" to --Jul. 19, 2004--. |
| 1 | 8 | Change "disclosure" to --disclosures--. |
| 2 | 41 | Change "acceleration a" to --acceleration $\alpha$--. |
| 9 | 32 | Change "sticking of cells" to --stacking of cells--. |
| 11 | 43 | Change "ill communication" to --in communication--. |

Signed and Sealed this

Eleventh Day of January, 2011

David J. Kappos
*Director of the United States Patent and Trademark Office*